(12) United States Patent
Forgas

(10) Patent No.: US 9,116,247 B2
(45) Date of Patent: Aug. 25, 2015

(54) STEREO DETECTION CIRCUIT FOR DETECTING NEUTRONS

(71) Applicant: PartTec, Ltd., Greencastle, IN (US)

(72) Inventor: Robert Forgas, Bloomington, IN (US)

(73) Assignee: PartTec Ltd., Greencastle, IN (US)

( * ) Notice: Subject to any disclaimer, the term of this patent is extended or adjusted under 35 U.S.C. 154(b) by 0 days.

(21) Appl. No.: 14/340,009

(22) Filed: Jul. 24, 2014

(65) Prior Publication Data

US 2014/0332690 A1 Nov. 13, 2014

Related U.S. Application Data

(63) Continuation-in-part of application No. 14/077,874, filed on Nov. 12, 2013, now Pat. No. 8,946,646.

(60) Provisional application No. 61/724,811, filed on Nov. 9, 2012.

(51) Int. Cl.
*G01T 3/06* (2006.01)
*G01T 7/00* (2006.01)

(52) U.S. Cl.
CPC .... *G01T 3/06* (2013.01); *G01T 7/00* (2013.01)

(58) Field of Classification Search
CPC .................................. G01T 3/06; G01T 7/00
USPC ................................ 250/361 R, 390.01, 391
See application file for complete search history.

(56) References Cited

U.S. PATENT DOCUMENTS

| | | | | |
|---|---|---|---|---|
| 5,600,144 A * | 2/1997 | Worstell | .................... | 250/363.03 |
| 7,244,947 B2 * | 7/2007 | Polichar et al. | .......... | 250/390.01 |
| 7,514,694 B2 * | 4/2009 | Stephan et al. | .......... | 250/390.01 |
| 7,521,686 B2 * | 4/2009 | Stuenkel et al. | .......... | 250/390.11 |
| 2002/0121604 A1* | 9/2002 | Katagiri | ......................... | 250/368 |
| 2004/0238751 A1* | 12/2004 | Penn | ......................... | 250/390.01 |
| 2007/0029493 A1* | 2/2007 | Kniss et al. | ............... | 250/370.11 |

* cited by examiner

*Primary Examiner* — Mark R Gaworecki
(74) *Attorney, Agent, or Firm* — Dean McConnell IP Law

(57) ABSTRACT

A neutron detector circuit for a neutron detector is disclosed that includes a scintillator having a plurality of wavelength shifting optical fibers. A first detection circuit is connected with a first PMT output that is configured to generate a first detection circuit output in response to a first neutron event. A second detection circuit is connected with a second PMT output that is configured to generate a second detection circuit output in response to a second neutron event. A coincidence detection circuit is included that has inputs connected with the first and second detection circuit outputs that is configured to generate a neutron event count output pulse in response to coincident signals being received by the coincidence detection circuit from the first and second detection circuit outputs.

20 Claims, 17 Drawing Sheets

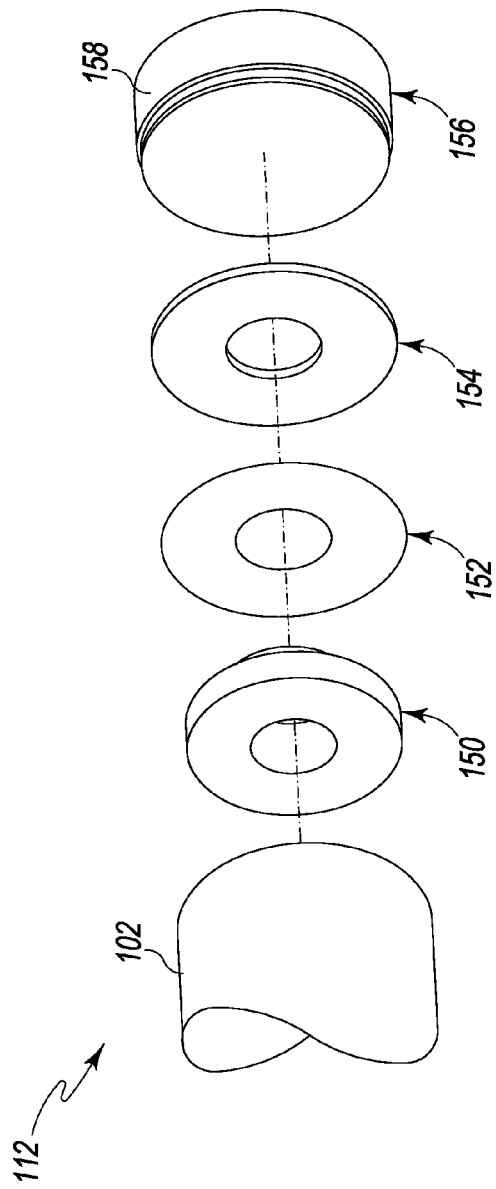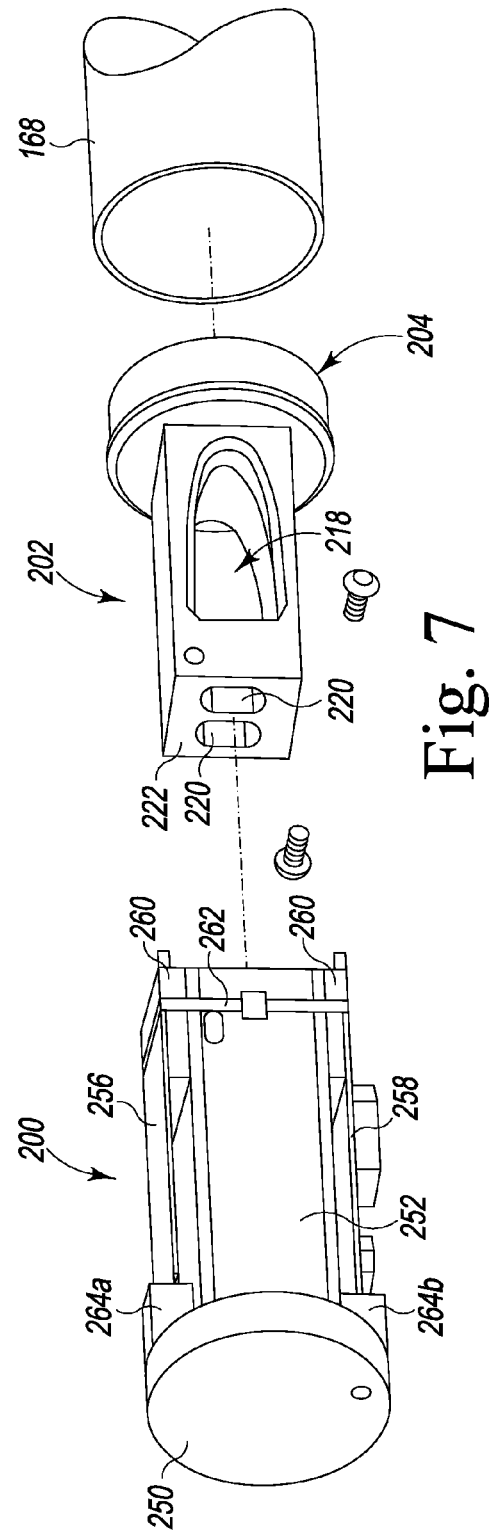

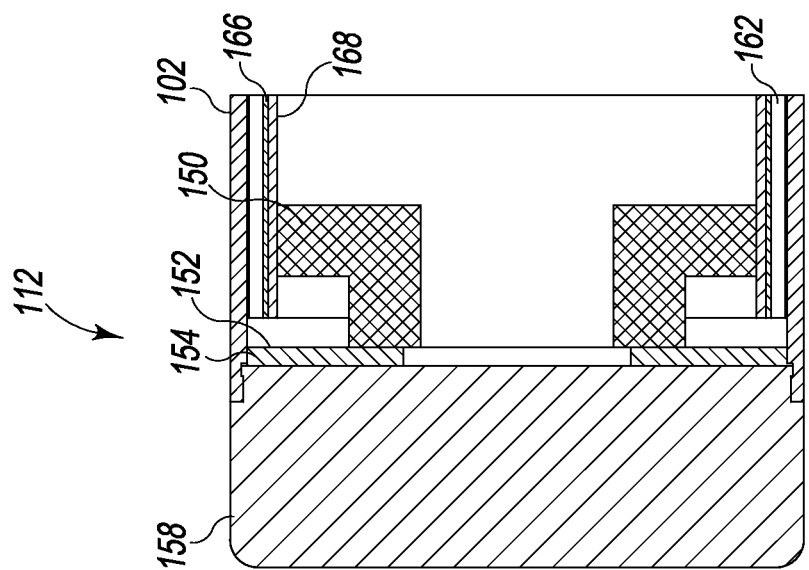
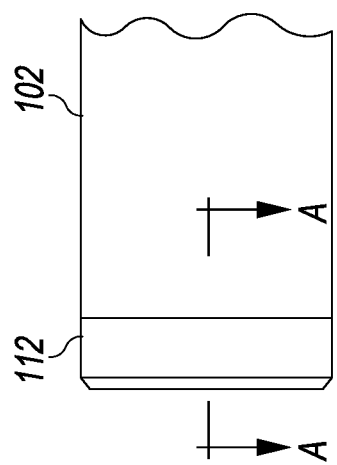
Fig. 10

STEREO DETECTION CIRCUIT FOR DETECTING NEUTRONS

CROSS REFERENCE TO RELATED APPLICATIONS

The present application is a continuation-in-part of U.S. application Ser. No. 14/077,874 filed on Nov. 12, 2013 which claims the benefit of and priority to U.S. Provisional Application No. 61/724,811 filed on Nov. 9, 2012.

BACKGROUND

Neutron detection is an important function for many areas of scientific study and security functions. Detection of a neutron requires the capture of an incident neutron, determination that a neutron capture has occurred, and communication of the neutron event to an operator or output device. Presently known neutron detection devices suffer from one or more of the following drawbacks: devices have difficulty distinguishing a neutron event from a gamma radiation event, devices utilize expensive hardware and/or complex software requiring expensive hardware to operate at sufficient speeds, devices utilize bulky hardware limiting portability, devices have large and/or unusual power requirements, and/or devices have a low neutron capture efficiency. Therefore, further technological developments are desirable in this area.

BRIEF DESCRIPTION OF THE DRAWINGS

FIG. 5 illustrates a component view of the end cap assembly illustrated in FIG. 1.

FIG. 7 illustrates the sensor assembly and photomultiplier tube fiber guide.

FIG. 10 represents a cross-sectional view of the end cap assembly along axis A-A as illustrated.

DESCRIPTION OF ILLUSTRATIVE EMBODIMENTS

Figure 1:
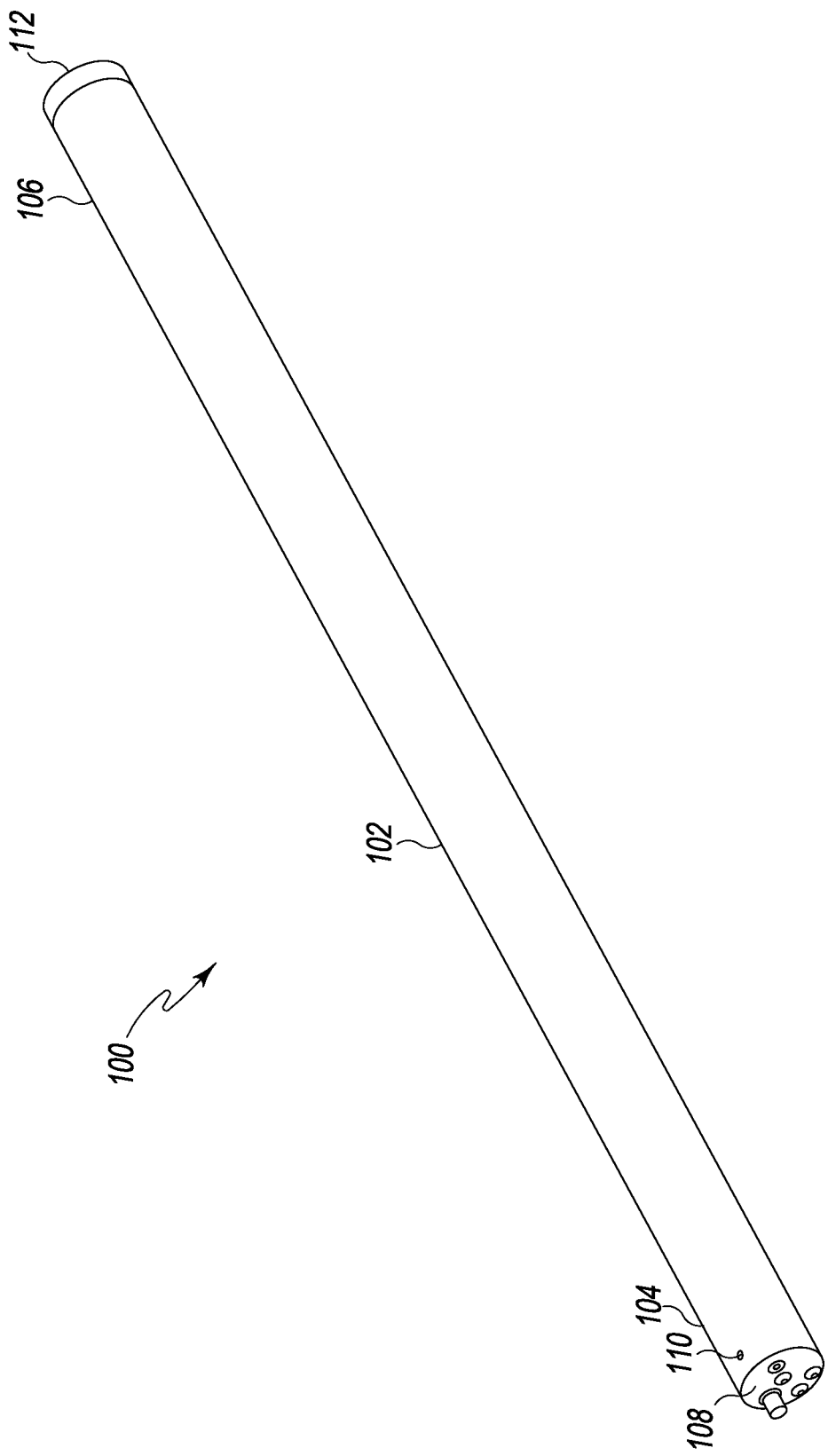
FIG. 1 illustrates a tubular shaped neutron detector.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, a neutron detector 100 is depicted that is capable of detecting neutron incidents or events. The neutron detector 100 includes an outer elongate housing or tube 102 that has a generally tubular cylindrical shape. The outer housing 102 has a proximate end 104 and a distal end 106. The tubular shape is a convenient form factor, providing for scintillator space within the tube. The proximate end 104 of the outer housing 102 includes an interface or electrical cap assembly 108 positioned within an inside diameter of the outer housing 102. The proximate end 104, in this illustrative form of the invention, is the assembly end, where electronics and other parts are inserted into the outer housing 102, and a set screw 110, or other fixing feature, is applied to finish the device assembly and fix the electronics in place within the outer housing 102. At the proximal end 106 of the outer housing 102 is an end cap assembly 112 that in this form, is press fit or friction fit within the inside diameter of the outer housing 102.

Figure 2:
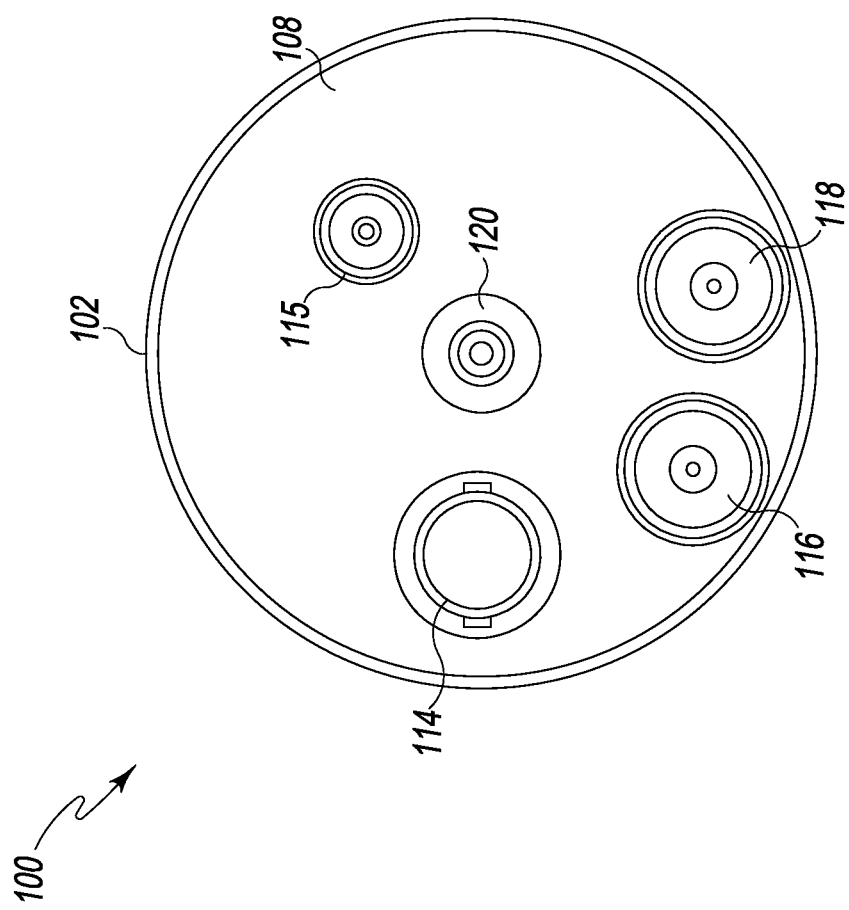
FIG. 2 illustrates the cap assembly end of the neutron detector depicted in FIG. 1.

Referring to FIG. 2, an end view of the proximal end 104 of the neutron detector 100 is depicted. An electrical output connector 114 protrudes outwardly from the electrical cap assembly 108. The connector 104 is any type of desired electrical or other output connection, and is an analog electrical connector in the example of FIG. 1 such as, by way of example, a TTL connector. In response to a neutron event, a voltage is output on the output connector 114 that can be passed to a high speed counter for example. As further illustrated, the electrical cap assembly 108 also includes a power input connector 115. As set forth in greater detail below, the power input connector 115 allows a power source to be plugged into the neutron detector 100 thereby driving the electronics within the neutron detector 100. In this form, the neutron detector 100 is powered by 12 VDC. A set screw 110 is provided to secure the electrical cap assembly 108 to the outer housing 102 but the electrical cap assembly 108 could be secured in other ways such as by a friction fit.

The electrical cap assembly 108 also includes a high voltage gain calibration rubber cap 116, a high voltage feedback rubber cap 118, and a service pull cap 120. The high voltage gain calibration rubber cap 116 provides access to an adjustment whereby the voltage of a photomultiplier tube can be adjusted. The high voltage feedback rubber cap 118 provides access to a pin socket whereby a volt meter may be placed to check the status of the voltage of the photomultiplier tube. The depicted connections are non-limiting examples, and certain connector types may be included or omitted. Further example connections or devices that may be included in the electrical cap assembly 108 of the detector 100 include any type of connector, display output (e.g. temperature, neutron count, etc.), a lamp, a speaker, or any other device known in the art.

The tube shape in the example of FIGS. 1 and 2 is circular, but any cross-sectional shape is contemplated herein, including without limitation elliptical, square, quadrangular, triangular, or other shapes. The outer housing 102 may be any material that will not block neutrons. Example and non-limiting housing materials include aluminum, certain plastics, steel or stainless steel, and/or magnesium. In certain embodiments, the housing 102 may include a neutron moderating material such as polyethylene.

Figure 3:
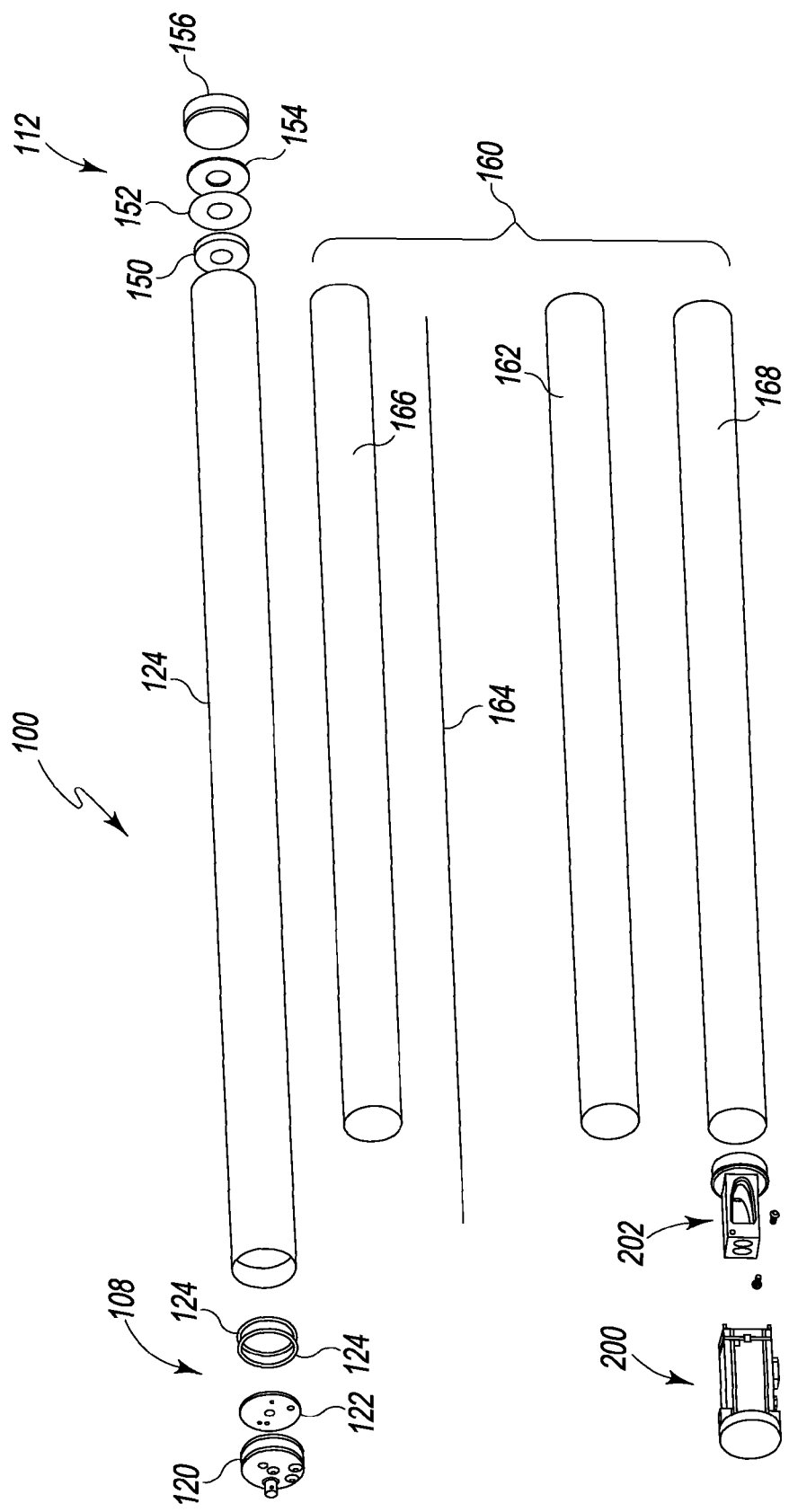
FIG. 3 illustrates a breakaway view of certain components of the neutron detector depicted in FIG. 1.
Figure 4:
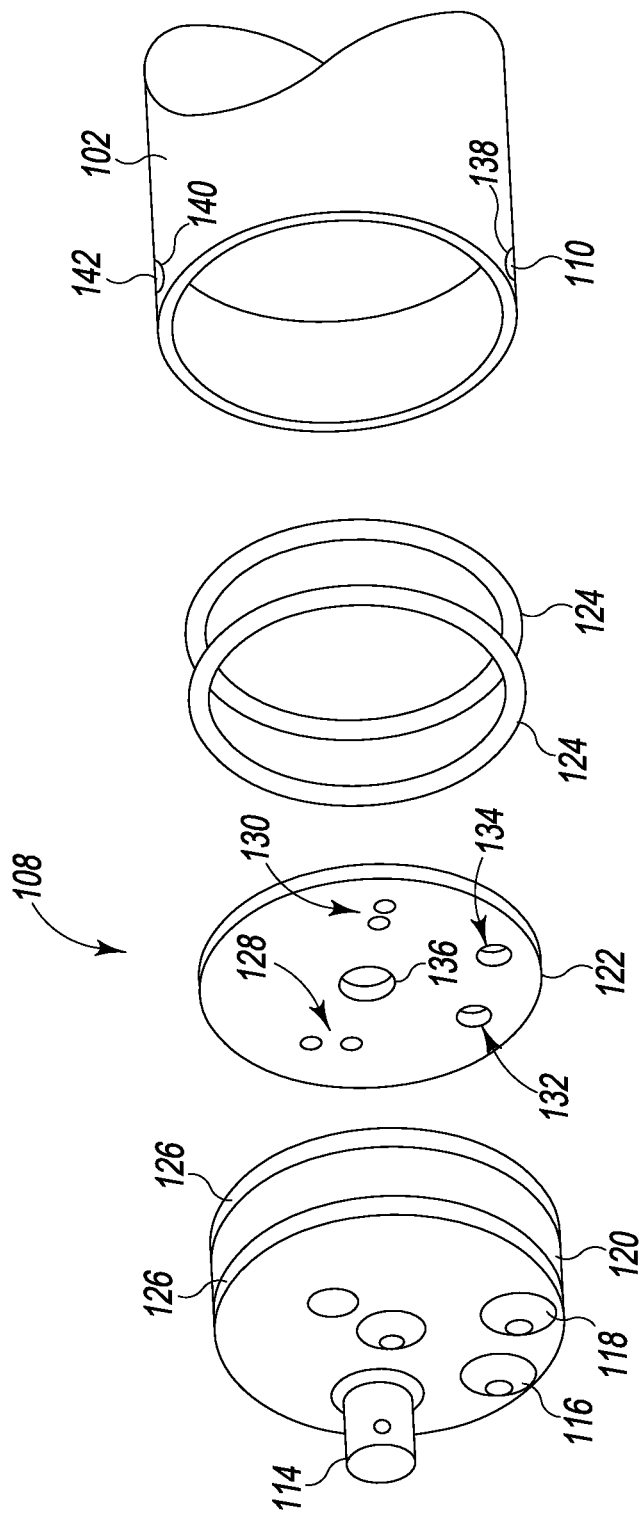
FIG. 4 illustrates a component view of the electrical cap assembly illustrated in FIG. 1.

Referring to FIG. 3, a breakaway view of certain components of the neutron detector 100 is depicted. As illustrated, the outer visible portion of the neutron detector include the outer housing 102, the electrical cap assembly 108, and the end cap assembly 112. Referring collectively to FIGS. 3 and 4, the electrical cap assembly 108 includes a front cap 120, a foam cushion 122, and a pair of O-rings 124. The front cap 120 has a generally cylindrical configuration with a certain thickness. A pair of O-ring slots 126 are included around the circumference of the front cap 120 spaced apart from one another. When assembled, the O-rings 124 are positioned in the O-ring slots 126 so that the end cap assembly 108 is sealed within the outer housing 102.

The foam cushion 122 has a generally cylindrical shape having a predetermined thickness. A pair of output signal apertures 128 are provided in the foam cushion 122 that generally line up with the electrical output connector 114. A pair of power input apertures 130 are also provided in the foam cushion 122 that generally line up with the power input connector 115. A high voltage gain aperture 132 is provided as well as a high voltage test feedback aperture 134 and a central aperture 136 in the foam cushion 122.

As further illustrated, the set screw 110 is positioned within a tube aperture 138 in the outer housing 102. As previously set forth, the set screw 110 is used to secure the electrical cap assembly 108 to the outer housing 102. A gas aperture 140 is provided in the outer housing 102 that is sealed with a sealing member 142. In one embodiment, once assembled, the interior portion of the neutron detector 100 is vacuumed out and a dry gas is injected into the interior portion of the neutron detector 100. In one form, the dry gas that is injected into the interior portion of the neutron detector 100 comprises nitrogen, but any other gas without water could be used in other forms. This is done to ensure that the internal components are not exposed to moisture thereby causing corrosion or other faults. The sealing member 142 is used to seal the dry gas in the interior portion of the neutron detector 100.

Referring to FIGS. 3 and 5, a component view of the end cap assembly 112 is illustrated. As illustrated, the end cap assembly 112 includes a core-cast plug 150, a reflector disk 152, an end cap foam disk 154, and an end cap 156. The core-cast plug 150 is used to help seal the distal end 106 of the neutron detector 100. In one form, the core-cast plug 150 is made from a rubber material that is suitable for creating a friction fit seal with the inside diameter of the outer housing 102. The reflector disk 152 is positioned between the plug 150 and the foam disk 154 and is used to reflect photons back into the interior portion of the neutron detector 100. The foam disk 154 is positioned between the reflector disk 152 and the end cap 156 and is used as a protective barrier between these respective components. In alternative forms, an O-ring 158 may be included on the end cap 156 to help further seal the interior portion of the neutron detector 100. During assembly, the end cap assembly 112 may be press fit into the interior portion of the outer housing 102.

Figure 6:
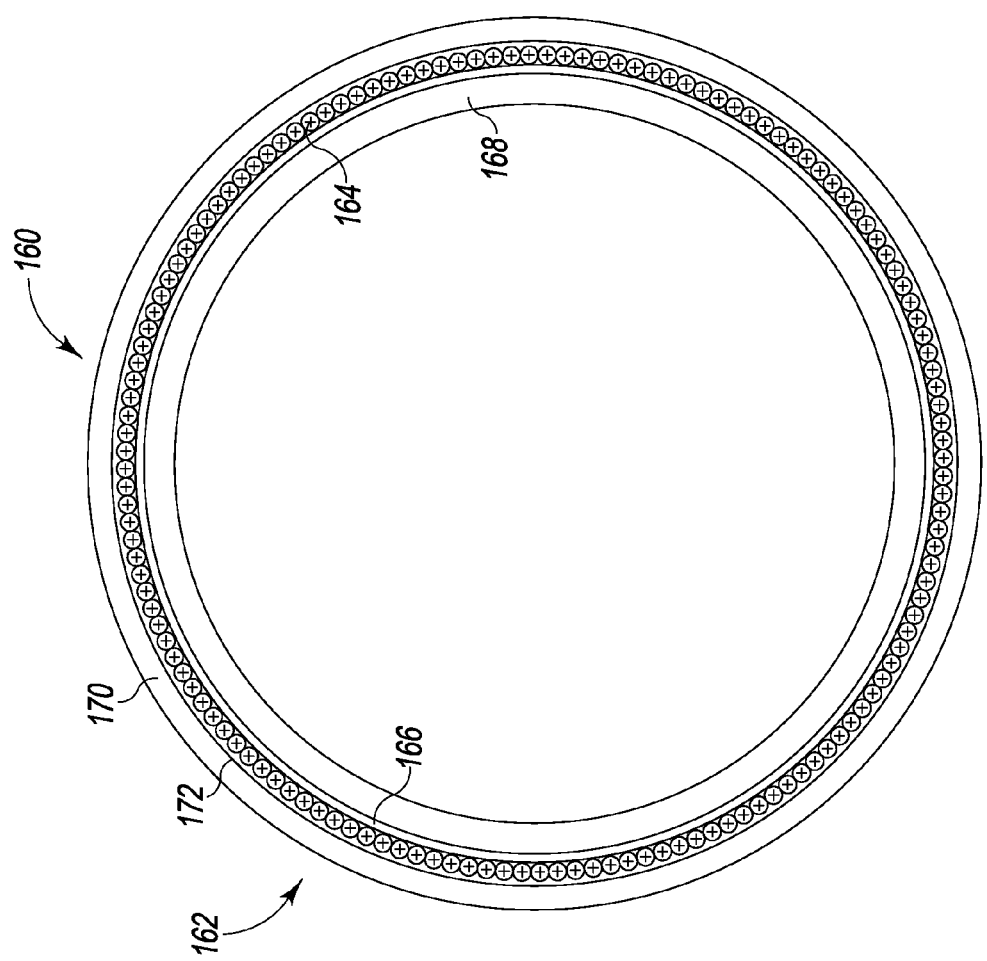
FIG. 6 illustrates a cross-sectional component view of a tubular scintillator based neutron detection assembly.

Referring collectively to FIGS. 3 and 6, a depiction of a tubular scintillator based neutron detection assembly 160 of the neutron detector 100 is illustrated. The detection assembly 160 comprises a reflector tube 162, a plurality of optical fibers 164, a scintillator tube 166, and an inner tube 168. The detection assembly 160 is configured to optimally detect ionizing radiation and, in particular, neutrons. Again, the "tubes" can take the form of various geometric shapes, however unless otherwise specified herein in the claims, tubular shapes should be viewed as a preferred or illustrative form of the present invention based on the results of experimentation unless claimed otherwise. In one form, the optical fibers 164 comprise one hundred and forty two (142) individual strands of fiber optic material that surround the circumference of an outer tube 170. In the preferred form, the optical fibers 164 comprise a wavelength shifting fiber that are designed to shift from blue light to green light.

The wavelength shifting fibers 164 emit photons of specific wavelengths axially down the fibers 164 in response to incident photons from the scintillator tube 166. The wavelength-shifting optical fibers are selected and arranged capture a greater percentage of visible photons through the use of two or more different color stages of wavelength-shifting fibers. In the preferred form, the scintillator tube 166 comprises a flexible scintillator material that is wrapped around the inner tube 168.

Referring to FIG. 6, the reflector tube 162 comprises the outer tube 170 that includes an inner layer 172. In one form, the outer tube 170 comprises an aluminum tube however it is envisioned that other materials may be used, such as by way of example, any material that allows electromagnetic radiation to pass transparently there-through. The inner layer 172 comprises a reflective layer of material that reflects electromagnetic radiation. In one preferred form, the reflective layer of material comprises reflective Mylar. The inner reflective layer 172 keeps photons from escaping and reflects photons back on the optical fibers 164. As a result, the inner reflective layer 172 intensifies the photons that are reflected back on the optical fibers 164. In another form, the inner layer 172 could comprise another layer of scintillator material.

Figure 8:
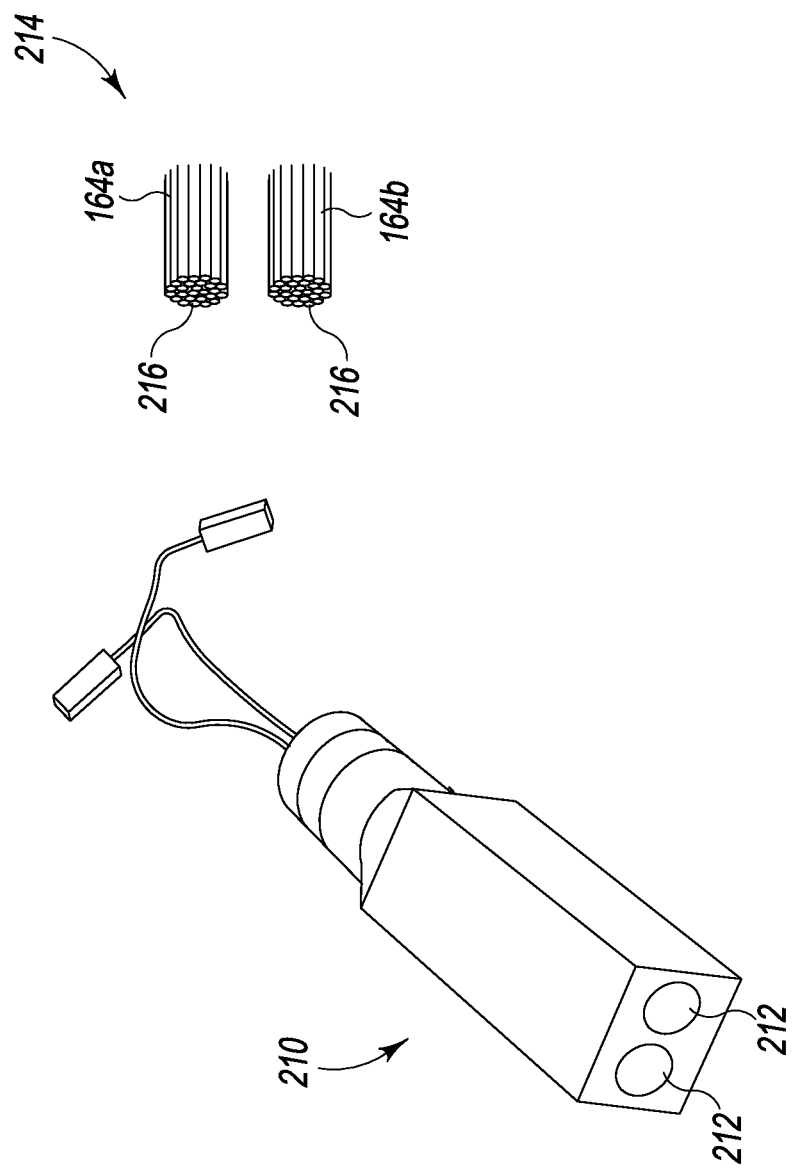
FIG. 8 illustrates a representative photomultiplier tube and fiber bundles.

Referring collectively to FIGS. 3 and 7, the neutron detector 100 includes a sensor assembly 200 and a fiber guide 202. The sensor assembly 200 is designed and operable to detect neutron events and produce an output signal that is transmitted to the output connector 114 in response thereto. The fiber guide 202 includes a distal end 204 that is designed to fit within the inside diameter of the inner tube 168. Referring to FIG. 8, a photomultiplier tube ("PMT") 210 is illustrated that is housed within the sensor assembly 200. In this example, the PMT 210 comprises a two-channel PMT but it should be appreciated that two one-channel PMTs could be used in other forms. Further, in other forms, a plurality of PMTs could be used in other embodiments.

In the illustrated form, the PMT 210 includes two photo responsive inputs or anodes 212 that are capable of generating output signals in response to a neutron event. In certain embodiments, alternating ones of the fibers 164 are routed to separate photo responsive inputs 212. For example, referencing FIG. 8, a detector 100 includes bundled amounts of fibers 214, the upper bundle being a first alternating half of the fibers 164a, and the lower bundle being a second alternating half of the fibers 164b. In a further example, the detector 100 includes a stereo detection scheme, wherein photons presented simultaneously from two adjacent fibers indicate an incident neutron, and wherein photons presented in a single fiber may indicate a gamma ray radiation event, which may be considered accordingly or ignored. Further details of an example detection algorithm, a "stereo detection" scheme, are described in U.S. patent application Ser. No. 12/880,505 entitled "Neutron Detector Having Enhanced Absorption and Bifurcated Detection Elements" filed on Sep. 13, 2010, which is incorporated herein by reference in the entirety for all purposes. The use of stereo detection affords the detector with very high neutron detection efficiency, low cross-sensitivity to gamma ray detection, and the use of inexpensive scintillator materials and construction.

Referring collectively to FIGS. 7 and 8, ends 216 of the fiber bundles 164a, 164b are routed through an interior portion 218 of the fiber guide 202 to fiber output ports 220 located at a proximal end 222 of the fiber guide 202. The ends 216 of the fiber bundles 164a, 164b are placed adjacent to the photo responsive inputs 212 of the PMT 210. The fiber bundles 164a, 164b are optically isolated from one another by being positioned in the fiber output ports 220. As a result, if a neutron event occurs, light is transmitted through the fiber bundles 214 to the respective photo responsive inputs 212 of the PMT 210. An output signal is then generated by the PMT 210 that is transmitted to the output connector 114.

Figure 9:
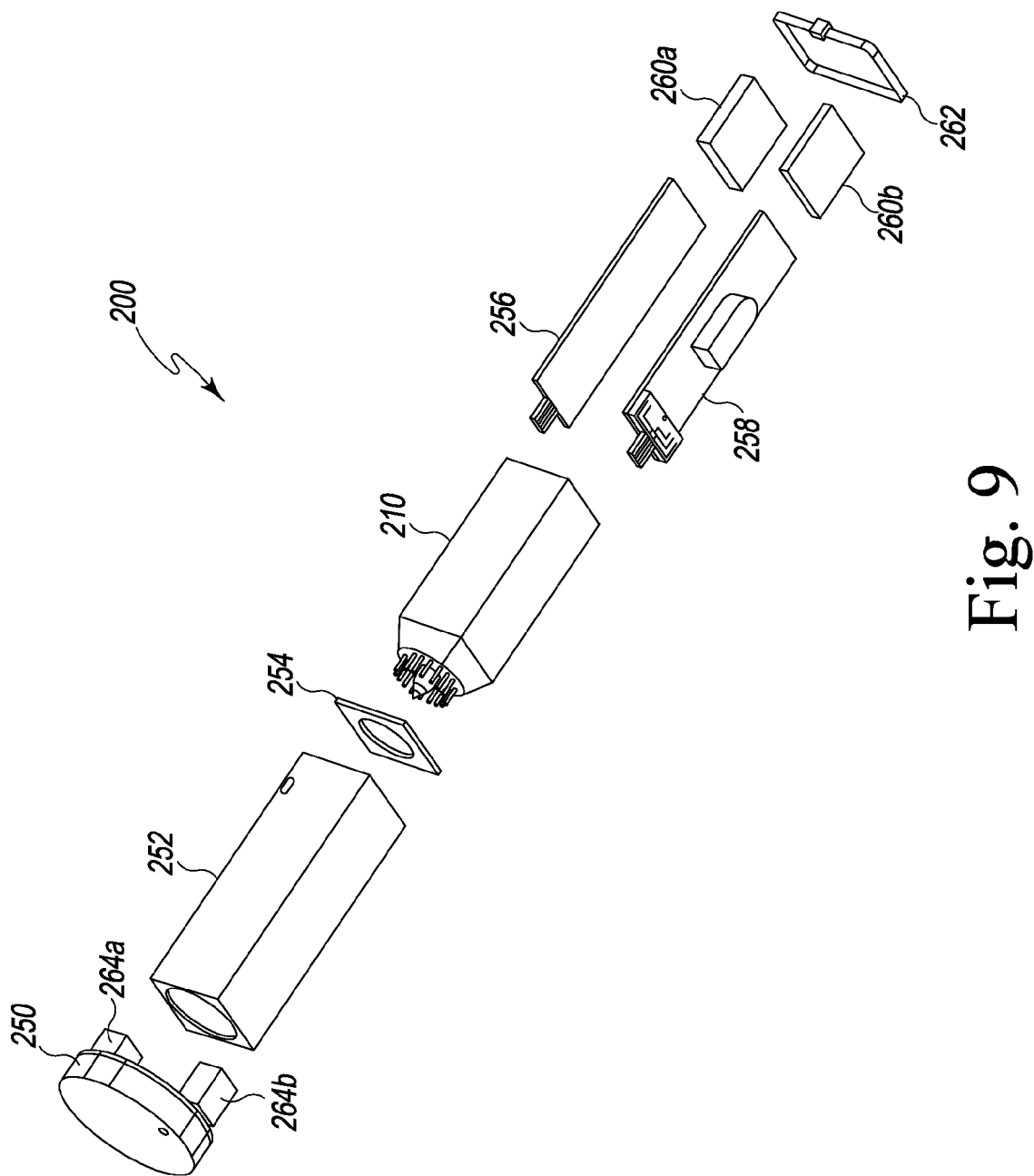
FIG. 9 illustrates a representative view of the components of the sensor assembly.

Referring collectively to FIGS. 7 and 9, a component view of an illustrative sensor assembly 200 is depicted. In this form, the sensor assembly 200 comprises a PMT base 250, a magnetic shield 252, a foam gasket 254, a two-channel PMT 210, a signal processing board 256, a high voltage supply board 258, a pair of foam pads 260, and a cable tie 262. The base 250 includes two edge connectors 264a, 264b into which connectors of the signal processing board 256 and high voltage supply board 258 are connected and will be described in further detail below. The PMT 210 fits or is housed within the magnetic shield 252 and the magnetic shield serves to protect the PMT 210 from unwanted noise or interference. The foam gasket 254 is positioned between a front end of the PMT 210 and a front end of the magnetic shield 252.

The signal processing board 256 is connected with the PMT 210 and an edge connector 264a. A foam pad 260a is used to space the signal processing board 256 from the magnetic shield 252. The signal processing board 256 is configured to generate output signals in response to a neutron detection event that are then transmitted to the TTL output connector 114. Although not illustrated, the TTL output connector 114 may be connected with a high speed counter that is used to process and monitor neutron detection events. The high speed counter could be connected with a computer, or could be a card in a computer, or any other type of device that could be monitored by a user to determine how to handle or record the neutron detection event.

The high voltage board 258 is connected with the PMT 210 and an edge connector 264b. The high voltage board 258 provides power to the PMT 210. The high voltage board 258 receives its power from a power source (not shown) that is connected with the power input connector 115. A foam pad 260b is used to space the high voltage board 258 from the magnetic shield 252. The cable tie 262 is used to secure the signal processing board 256 and the high voltage board 258 to the magnetic shield 252.

Referring to FIG. 10, the end cap assembly 112 is illustrated in a cross-section view shown along axis A-A. As illustrated, the end cap assembly 112 is secured to the outer tube 102 to provide an air tight seal. The core-cast plug 150 is positioned within an inside diameter of the inner tube 168. The reflective disk 152 is positioned between the core-cast plug 150 and the foam disk 154 and covers the entire inside diameter of the outer housing or tube 102. The reflective disk 154 serves to reflect photons back into the neutron detector 100. The foam disk 154 is also positioned within the inside diameter of the outer tube 102 and is located between the thermal cap 158 and the reflective disk 154. The thermal cap 158 is located on the end of the outer tube 102 and serves to seal the outer tube 102 from the atmosphere. In this form, the thermal cap 158 is friction fit on the end of the outer tube 102 but other connection means are envisioned (e.g.—adhesives, screws, and so forth).

Figure 11:
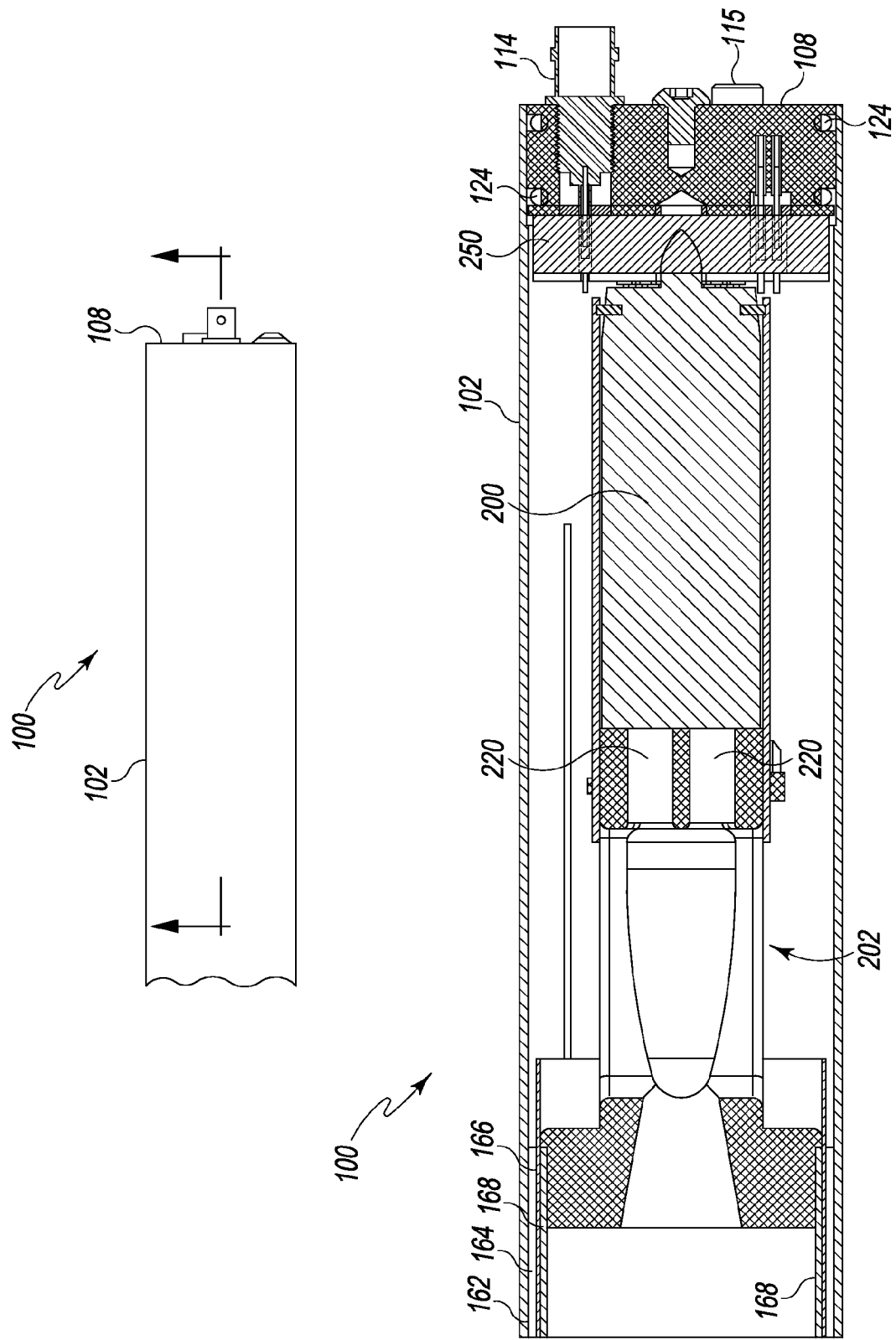
FIG. 11 represents a cross-sectional view of the neutron detector along axis B-B as illustrated.

Referring to FIG. 11, a cross-sectional view of the neutron detector 100 is illustrated along axis B-B. As illustrated, the reflector tube 162 is positioned along the inside diameter or wall of the outer tube or housing 102. The reflector disk 162 serves to reflect photons back onto the optical fibers 164. The optical fibers 164 wrap around the entire circumference of the scintillator tube 166. The scintillator tube 66 extends beyond a portion of the distal end of the PMT fiber guide 202. An end of the inner tube 168 is connected with the distal end of the PMT fiber guide 202. A proximal end of the PMT fiber guide 202 is connected with a distal end of the sensor assembly 200. A proximal end of the sensor assembly 200 is connected with the base 250.

Figure 12:
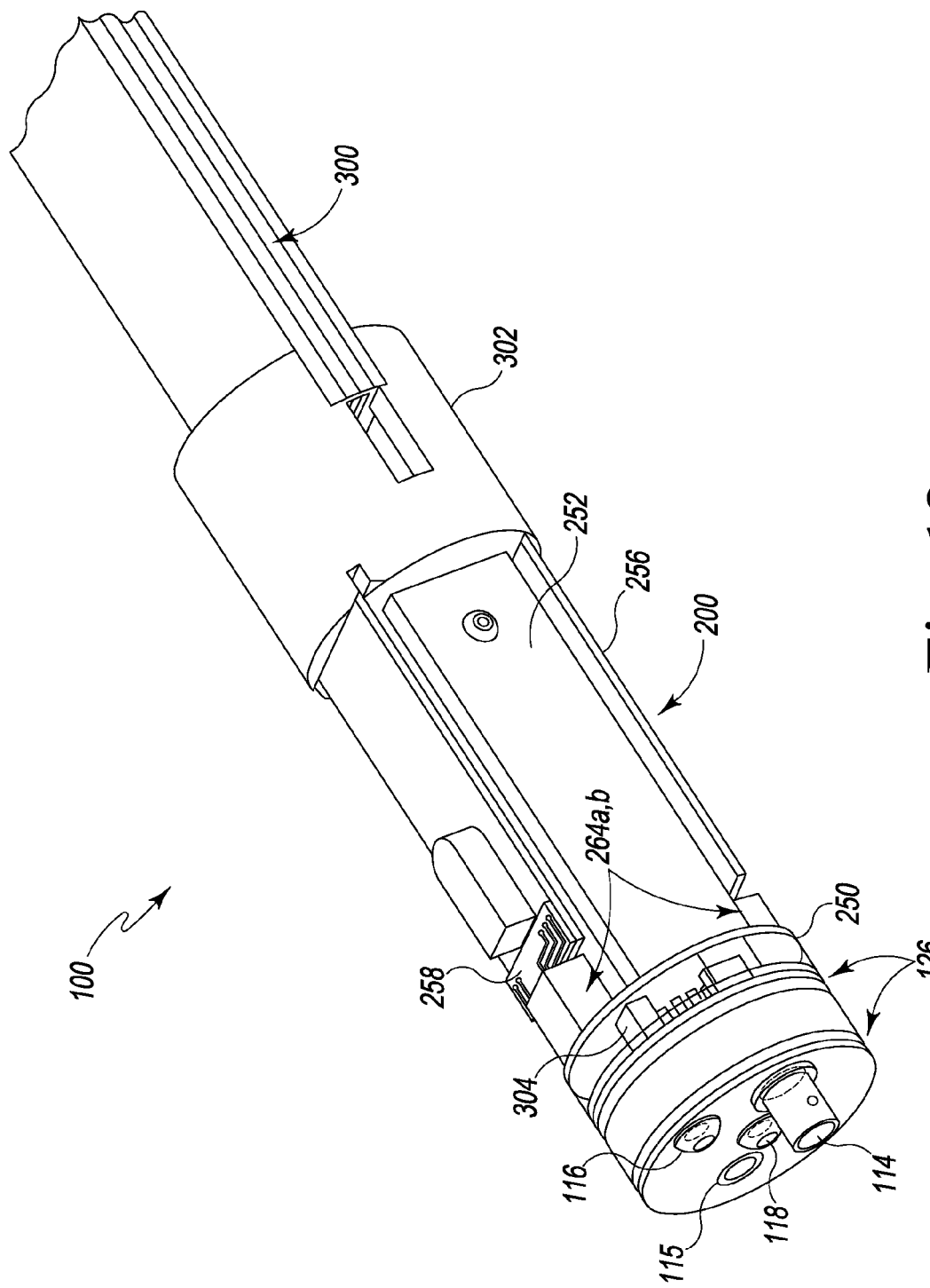
FIG. 12 represents a component view of a portion of an assembled neutron detector with the outer tube or housing removed.

Referring to FIG. 12, an assembly view of a portion of a representative neutron detector 100 is illustrated with the outer tube or housing 102 removed. In this form, a stacked scintillator assembly 300 is disclosed that is connected with a fiber interface 302. The stacked scintillator 300 includes fibers 164 that are positioned adjacent the photo responsive inputs 212 of the sensor assembly 200. As illustrated, the high voltage board 258 is positioned on top of the magnetic shield 252. The high voltage board 258 is connected with an edge connector 264 that is in turn connected with the power source connector 115 via the PMT base 250. A high voltage calibration module 304 is included on the PMT base 250 that allows a user to adjust the voltage of the PMT 210 if necessary. The user will remove the high voltage adjustment cap 116 in order to gain access to the high voltage adjustment module 304. A high voltage test feedback unit 306 is connected with the PMT base 250 and allows the user to take readings with a voltmeter of the voltage level of the PMT 210. The high voltage test cap 118 is removed in order to gain access to the high voltage test feedback unit. A potting or insulating material may be placed between the electrical cap assembly 108 and the PMT base 250.

Figure 13:
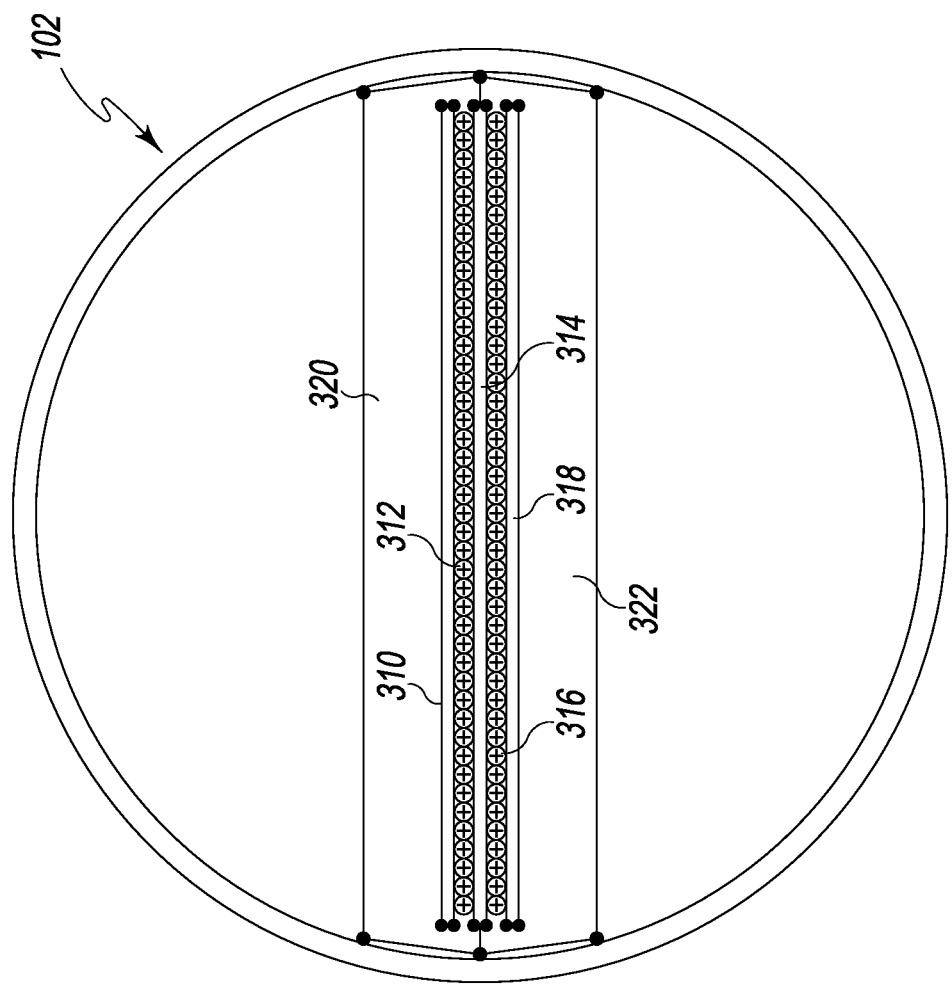
FIG. 13 represents a cross-sectional component view of a stacked scintillator based neutron detection assembly.

Referring to FIG. 13, a cross-sectional view of the stacked scintillator assembly 300 is depicted within the outer tube or housing 102. As with the other embodiment, the inner wall of the outer tube or housing 102 may be layered with a reflective material. In this form, a first scintillator layer 310 is included on top of a first layer of optical fiber 312. A second scintillator layer 314 is positioned between the first layer of optical fiber 312 and a second layer of optical fiber 316. A third scintillator layer 318 is positioned on the bottom of the second layer of optical fiber 316. This stacked scintillator arrangement is positioned within or sandwiched between an upper covering layer 320 and a lower covering layer 322. The stacked scintillator 300 extends substantially the entire length of the outer housing 102. The fibers 312, 314 are bundled together in the fiber interface 300 such that an end of the fibers is adjacent the photo responsive input of the photomultiplier tube. All other features are similar to that disclosed with respect to the previously discussed embodiment.

Figure 14:
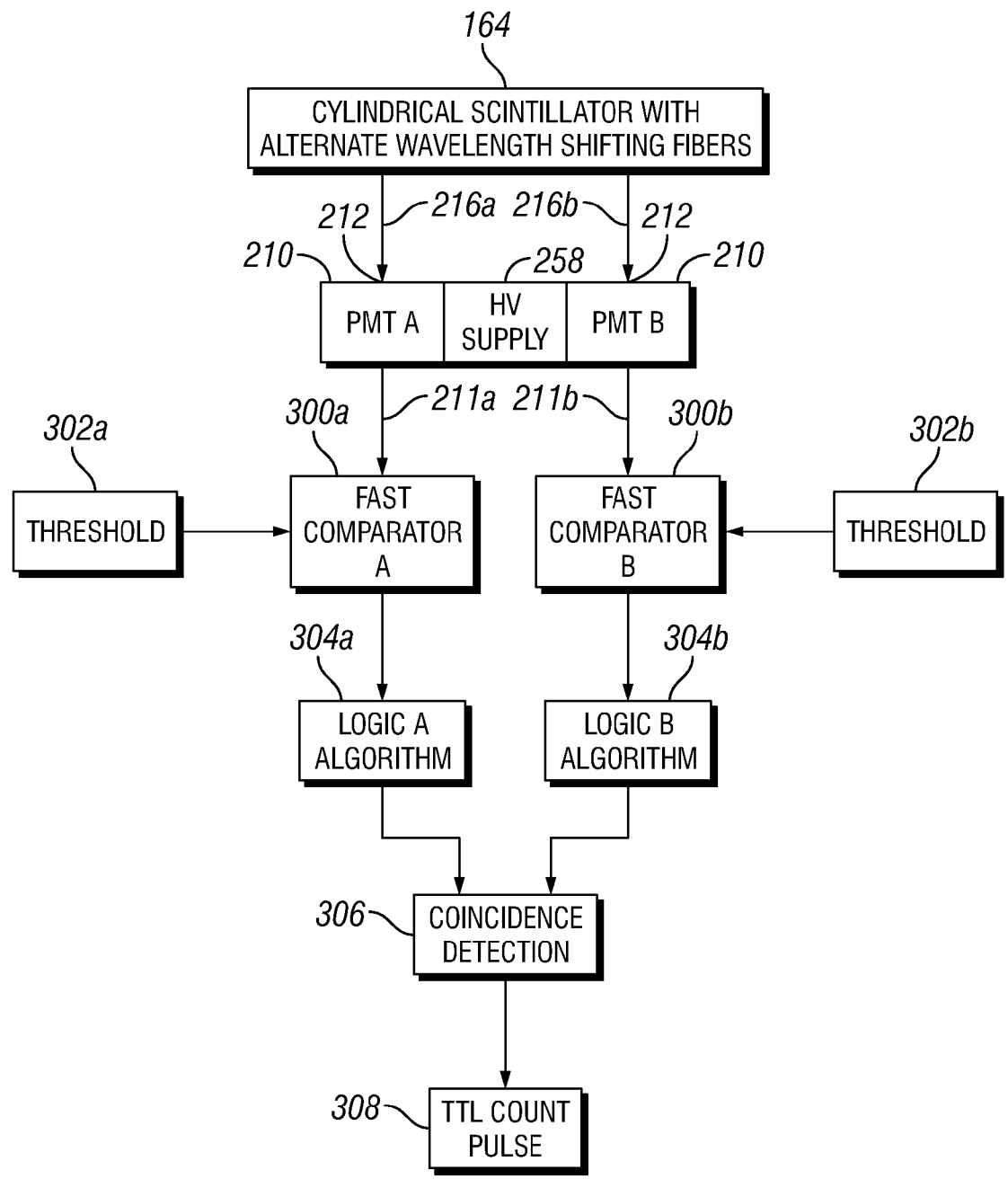
FIG. 14 represents a block diagram of circuit logic used on the signal processing board of the neutron detector.

Referring to FIG. 14, a block diagram of the circuitry of the signal processing board 256 is illustrated. As previously set forth, the tubular scintillator based neutron detection assembly 160 includes a plurality of wavelength shifting optical fibers 164. In one form, a first end 216a of a first set of wavelength shifting optical fibers 164 is directed to a first photo responsive input of a PMT 210. A second end 216b of a second set of wavelength shifting optical fibers 164 is directed to a second photo responsive input of the PMT 210. In the preferred form, alternate wavelength shifting optical fibers 164 are directed to the first and second photo responsive inputs of the PMT 210 (See FIGS. 6 and 8). Further, as previously set forth, one or more PMTs 210 could be used in the present invention but in the preferred form, a dual channel PMT 210 having two photo responsive inputs 212 is implemented that receives the ends 216a, 216b of the alternate wavelength shifting optical fibers 164. In FIG. 14, the dual channels of the PMT 210 are represented as "PMT A" and "PMT B" and the PMT 210 has a PMT A output 211a and a PMT B output 211b.

As previously set forth, a high voltage supply board 258 is included that is connected with the one or more PMTs 210. The high voltage supply board 258 powers the PMT 210 and is used to adjust the gain of the PMT 210. In one form, the high voltage supply board 258 provides approximately 1470 Volts to the one or more PMTs 210. The high voltage supply board 258 is used to supply energy to the PMT 210 to take a very weak signal generated by a neutron event detected on the wavelength shifting optical fibers 164 and amplify it to a much stronger signal that is output on outputs 211a, 211b.

In response to a neutron event detected on the wavelength shifting optical fibers 164, a signal is generated that is output from channels A and B of the PMT 210. The output of channel A of the PMT 210 is directed to an input of a first fast comparator 300a and the output of channel B of the PMT 210 is directed to an input of a second fast comparator 300b. A first threshold voltage supply 302a is connected with the first fast comparator 300a and a second threshold voltage supply 302b is connected with the second fast comparator 300b. Once an output voltage from channel A and channel B of the PMT 210 goes above the voltage level of the first and second threshold voltage supplies 302a, 302b, a digital output signal is generated by the first and second fast comparators 300a, 300b.

The digital output from the first comparator 300a is directed to a first logic algorithm circuit 304a and the digital output from the second comparator 300b is directed to a second logic algorithm circuit 304b. The first logic algorithm circuit 304a is configured to generate an output pulse having a first predetermined duration in response to output signals from the first fast comparator 300a. In one form, one logic level input pulse from the first fast comparator 300a will generate an approximate 3 microsecond count enable pulse and an approximate 150 nanosecond count enable pulse within the first logic algorithm circuit 304a. In response to an output pulse from the second fast comparator 300b, the second logic algorithm circuit 304b generates an approximate 3 microsecond count enable pulse and an approximate 150 nanosecond count enable pulse within the second logic algorithm circuit 304b. Once the count enable pulses of the first and second logic algorithm circuits 304a, 304b reach a predetermined count, each logic algorithm circuit 304a, 304b generates an output pulse that is directed toward a coincidence detection circuit 306.

As illustrated in FIG. 14, the outputs of the first and second logic algorithm circuits 304a, 304b are connected with the coincidence detection circuit 306. The coincidence detection circuit 306 is configured to generate a neutron count output pulse 308 when any coincident pulses exist between the outputs of the first and second logic algorithm circuits 304a, 304b. In one form, the neutron count output pulse 308 is generated when any coincident logic high exists between the outputs of the first and second logic algorithm circuits 304a, 304b. In one form, the neutron count output pulse 308 has a duration of approximately 800 nanoseconds. The output of the coincidence detection circuit 306 is coupled to the electrical output connector 114 of the neutron detector 10.

Figure 15:
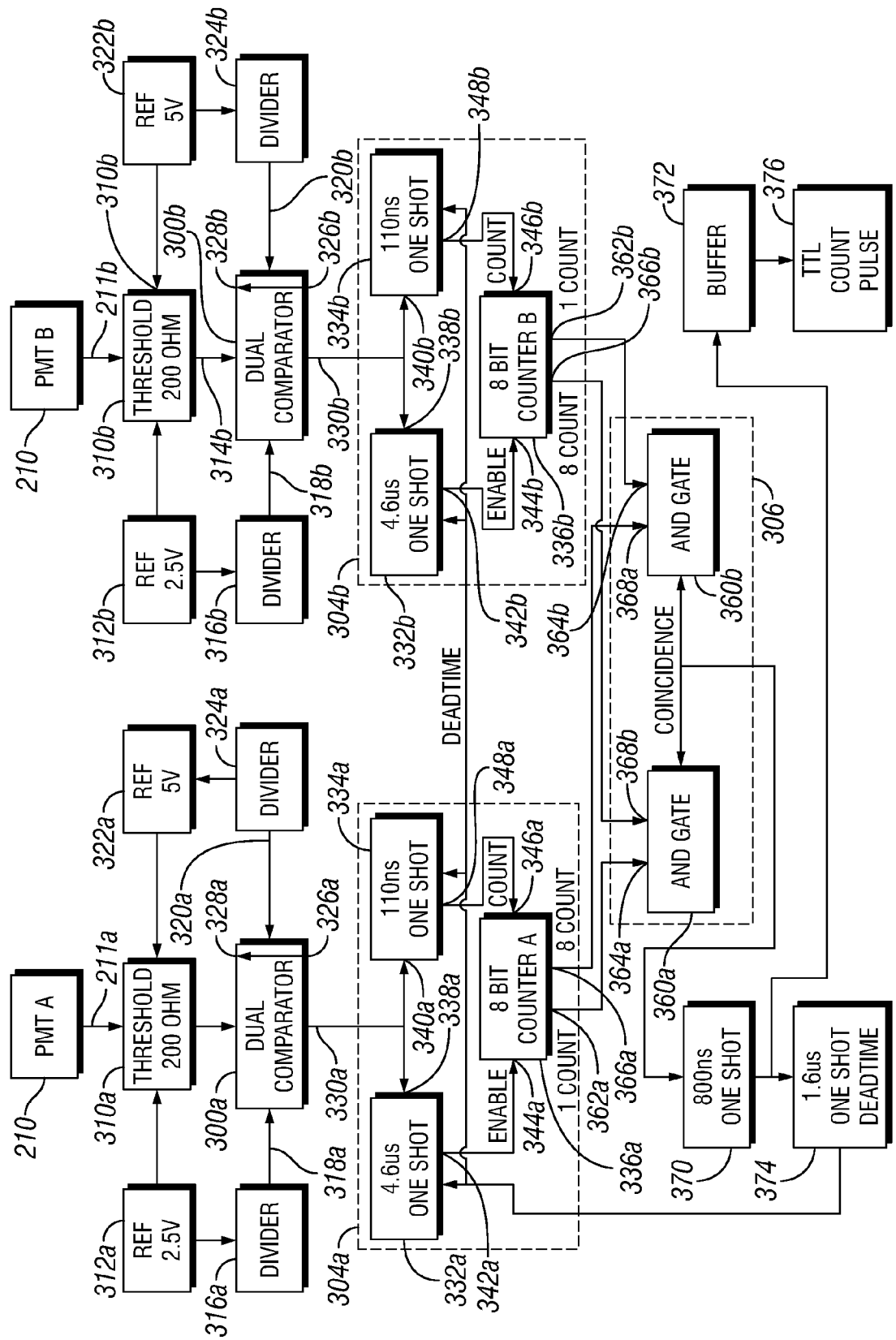
FIG. 15 represents a more detailed block diagram of circuit logic used on the signal processing board of the neutron detector.

Referring to FIG. 15, a more detailed block diagram of the circuitry on the signal processing board 256 is illustrated. As illustrated, the first output 211a of the dual channel PMT 210 is connected with a threshold resistor 310a. The second output 211b of the dual channel PMT 210 is also connected with a threshold resistor 310b. Although a dual channel PMT 210 is used in the preferred form, it should be appreciated that two PMTs could be used in other forms. In one form, the threshold resistors 310a, 310b comprise a 200 Ω resistor. Threshold resistor 310a is also connected with a reference voltage supply 312a and an input 314a of comparator 300a. In one form, reference voltage supply 312a comprises a 2.5V supply. Threshold resistor 310b is also connected with a reference voltage supply 312b and an input 314b of comparator 300b. In one form, reference voltage supply 312b comprises a 2.5V supply.

Reference voltage supply 312a is also connected with a voltage divider 316a. An output of the first voltage divider 316a is connected with a second input 318a of comparator 310a. A reference voltage supply 322a is connected with a voltage divider 324a. An output of voltage divider 324a is connected with an input 320a of comparator 300a. In one form, reference voltage supply 322a comprises a 5V supply. An output 326a of comparator 300a is connected with an input 328a of comparator 300a.

During a neutron event, an output voltage is generated on output 211a of the PMT 210 that is directed to input 314a of comparator 300a. As a result, a voltage differential is created between input 314a and input 318a of comparator 300a thereby triggering output 326a to change states. In one form, output 326a goes from a logic high to a logic low as it is the inverting output of comparator 300a. As a result of the output signal on output 326a, which is directed to input 328a of comparator 300a, a voltage differential is created between the inputs 320a, 328a of comparator 300a thereby causing an output 330a of comparator 300a to generate an output pulse. During a neutron event, several output pulses will be generated on output 330a of comparator 300a thereby creating a pulse train.

Output 211b of the PMT 210 is directed to an identical circuit arrangement as discussed above with respect to output 211a of the PMT 210. As such, a detailed discussion of a portion of the circuits used with respect to output 211b is not being discussed for the sake of brevity. As with the discussion above, during a neutron event, an output voltage is generated on output 211b of the PMT 210 that is directed to input 314b of comparator 300b. As a result, a voltage differential is created between input 314b and input 318b of comparator 300b thereby triggering output 326b to change states. In one form, output 326b goes from a logic high to a logic low as it is the inverting output of comparator 300b. As a result of the output signal on output 326b, which is directed to input 328b of comparator 300b, a voltage differential is created between the inputs 320b, 328b of comparator 300b thereby causing an output 330b of comparator 300b to generate an output pulse. During a neutron event, several output pulses will be generated on output 330b of comparator 300b thereby creating an output pulse train.

The first logic algorithm circuit 304a comprises a first dual non-retriggerable monostable multivibrator 332a, a second dual non-retriggerable monostable multivibrator 334a, and a first counter 336a. In one form, the multivibrators disclosed herein comprise dual non-retriggerable monostable multivibrators manufacture by Fairchild Semiconductor as part No. 74VHC221A. Further, in one form, the counters disclosed herein comprise an 8-Bit Serial-In/Parallel-Out Shift Register manufactured by Fairchild Semiconductor as part No. 74VHC164.

As illustrated, output 330a of comparator 300a is connected to an input 338a of the first multivibrator 332a and an input 340a of multivibrator 334a. An output 342a of multivibrator 332a is connected with an input 344a of counter 336a. In response to a signal from output 330a of comparator 300a, multivibrator 332a is configured to generate an output pulse that is directed to the input 344a of counter 336a. In one form, input 344a of counter 336a is configured to enable counter 336a. The output pulse from multivibrator 332a is configured to have a predetermined duty cycle. In one form, the duty cycle of the output pulse from multivibrator 332a is configured to have a duty cycle of about 4.6 microseconds. As such, the output pulse from multivibrator 332a is configured to activate or enable counter 336a for a period of about 4.6 microseconds. Since multivibrator 332a is non-retriggerable, until the 4.6 microsecond activation period has expired, output 342a of multivibrator 332a will maintain its active state until the expiration of the 4.6 microsecond activation period no matter how many pulses are received by the output pulse train of comparator 300a.

As previously set forth, output 330a is also directed to input 340a of multivibrator 334a. In response to a signal from output 330a of comparator 300a, multivibrator 334a is configured to generate an output pulse that is directed to an input 346a of counter 336a. In one form, input 346a of counter 336a is configured to act as a count input that causes counter 336a to begin counting and generating corresponding outputs. The output pulse from multivibrator 334a is configured to have a predetermined duty cycle. In one form, the duty cycle of the output pulse from multivibrator 334a is configured to have a duty cycle of about 110 nanoseconds. Since multivibrator 334a is non-retriggerable, until the 110 nanosecond activation period has expired, output 348a of multivibrator 334a will maintain its active state until the expiration of the 110 nanosecond activation period no matter how many pulses are received by the output pulse train of comparator 300a.

As further illustrated, output 330b of comparator 300b is connected to an input 338b of a third multivibrator 332b and an input 340b of a fourth multivibrator 334b. An output 342b of multivibrator 332b is connected with an input 344b of a counter 336b. In response to a signal from output 330b of comparator 300b, multivibrator 332b is configured to generate an output pulse that is directed to input 344b of counter 336b. In one form, input 344b of counter 336a is configured to enable counter 336a. The output pulse from multivibrator 332b is configured to have a predetermined duty cycle. In one form, the duty cycle of the output pulse from multivibrator 332b is configured to have a duty cycle of about 4.6 microseconds. As such, the output pulse from multivibrator 332b is configured to activate or enable counter 336b for a period of about 4.6 microseconds. Since multivibrator 332b is non-retriggerable, until the 4.6 microsecond activation period has expired, output 342b of multivibrator 332b will maintain its active state until the expiration of the 4.6 microsecond activation period no matter how many pulses are received by the output pulse train of comparator 300b.

Output 330b of comparator 300b is also directed to input 340b of multivibrator 334b. In response to a signal from output 330b of comparator 300b, multivibrator 334b is configured to generate an output pulse that is directed to an input 346b of counter 336b. In one form, input 346b of counter 336b is configured to act as a count input that causes counter 336b to begin counting and generating corresponding outputs. The output pulse from multivibrator 334b is configured to have a predetermined duty cycle. In one form, the duty cycle of the output pulse from multivibrator 334b is configured to have a duty cycle of about 110 nanoseconds. Since multivibrator 334b is non-retriggerable, until the 110 nanosecond activation period has expired, output 348b of multivibrator 334b will maintain its active state until the expiration of the 110 nanosecond activation period no matter how many pulses are received by the output pulse train of comparator 300b.

As illustrated, in one form, the coincidence detection circuit 306 comprises a first AND gate 360a and a second AND gate 360b. An output 362a of counter 336a is connected with an input 364a of the first AND gate 360a. An output 366a of counter 336a is connected with an input 368a of the second AND gate 360b. An output 362b of counter 336b is connected with an input 364b of the second AND gate 360b. An output 366b of counter 336b is connected with an input 368b of the first AND gate 360a.

In one form, output 362a of counter 336a is configured to activate or go to a logic high once two (2) count pulses are received from output 348a of multivibrator 334a. This is because the first output count pulse received from comparator 300a is ignored because counter 336a has not been enabled by multivibrator 332a. As such, input 364a of the first AND gate 360a goes high after two (2) count pulses are received by counter 336a from output 348a of multivibrator 334a. Output 362b of the second counter 336b is configured to activate or go to a logic high once two (2) count pulses are received from output 348b of multivibrator 334b. As such, input 364b of the second AND gate 360b goes high after two (2) count pulses are received by counter 336b from output 348b of multivibrator 334b.

Output 366a of counter 336a is configured to activate or go to a logic high after nine (9) count pulses are received from the second multivibrator 334a. This is once again because the first output pulse received by counter 336a enables counter 336a and does not count as a count pulse. As such, input 368a of AND gate 360b goes high after nine (9) count pulses are received by counter 336a from output 348a of multivibrator 334a. Output 366b of counter 336b is configured to activate or go to a logic high after nine (9) count pulses are received from multivibrator 334b. As such, input 368b to the first AND gate 360a is configured to go high after nine (9) count pulses are received by counter 336b from multivibrator 334b.

Referring collectively to FIGS. 14 and 15, the coincidence detection circuit 306 contains two AND gates 360a, 360b that each indirectly receive an input from each channel of the PMT 210. Each logic algorithm circuit 304a, 304b is configured to enable counters 336a, 336b in response to outputs from comparators 300a, 300b. Counters 336a, 336b are only enabled for a predetermined amount of time, which is about 4.6 microseconds in the preferred form. During this time period, a pulse train is generated by the outputs of comparators 300a, 300b that is fed to multivibrators 334a, 334b that are configured to cause counters 336a, 336b to begin counting.

Once each counter 336a, 336b receives two (2) pulses, a first output 362a, 362b is fed to inputs 364a, 364b of the AND gates 360a, 360b. Then, once each counter 336a, 336b receives nine (9) pulses, a second output 366a, 366b is fed to inputs 368a, 368b of the AND gates 360a, 360b. In order to get to nine (9) pulses, comparators 326a, 326b must generate nine (9) output pulses within 4.6 microseconds or counters 336a, 336b will be disabled by multivibrators 332a, 332b thereby resetting counters 336a, 336b. Also, each counter 336a, 336b must receive at least two (2) pulse counts from one respective comparator 300a, 300b and nine (9) pulse counts from another respective comparator 300a, 300b in order to cause the coincidence detection circuit 306 to generate a coincidence output. As such, each comparator 300a, 300b must be receiving output signals from each channel of the dual channel PMT 210 in order for a coincidence to be detected and an output to be generated from the signal processing board 256.

During a neutron event, an output will be generated from at least one of the AND gates 360a, 360b that is directed to an input of a multivibrator 370. As such, the outputs of both AND gates 360a, 360b are connected with an input of multivibrator 370. It is possible that each output of the AND gates 360a, 360b could be high at the same time. In one form, multivibrator 370 is configured to generate an output pulse having a predetermined duty cycle of 800 nanoseconds, but other duty cycles could be used in other forms. The output of multivibrator 370 is connected with an input of a buffer 372 and an input of a multivibrator 374. The buffer 372 is configured to generate a +5V TTL output pulse that is indicative of a pulse count for the detection of a neutron event, which is represented at 376.

The output of multivibrator 374 is connected with a reset or clear input of multivibrators 332a, 334a, 332b, 334b. In one form, multivibrator 374 is configured to create a dead time in which multivibrators 332a, 334a, 332b, 334b will not provide any outputs to counters 336a, 336b thereby causing them to reset. In one form, the dead time has a duty cycle of about 1.6 microseconds. As such, when a neutron event is detected, the circuit resets itself to begin the detection of another neutron event.

Figure 16A:
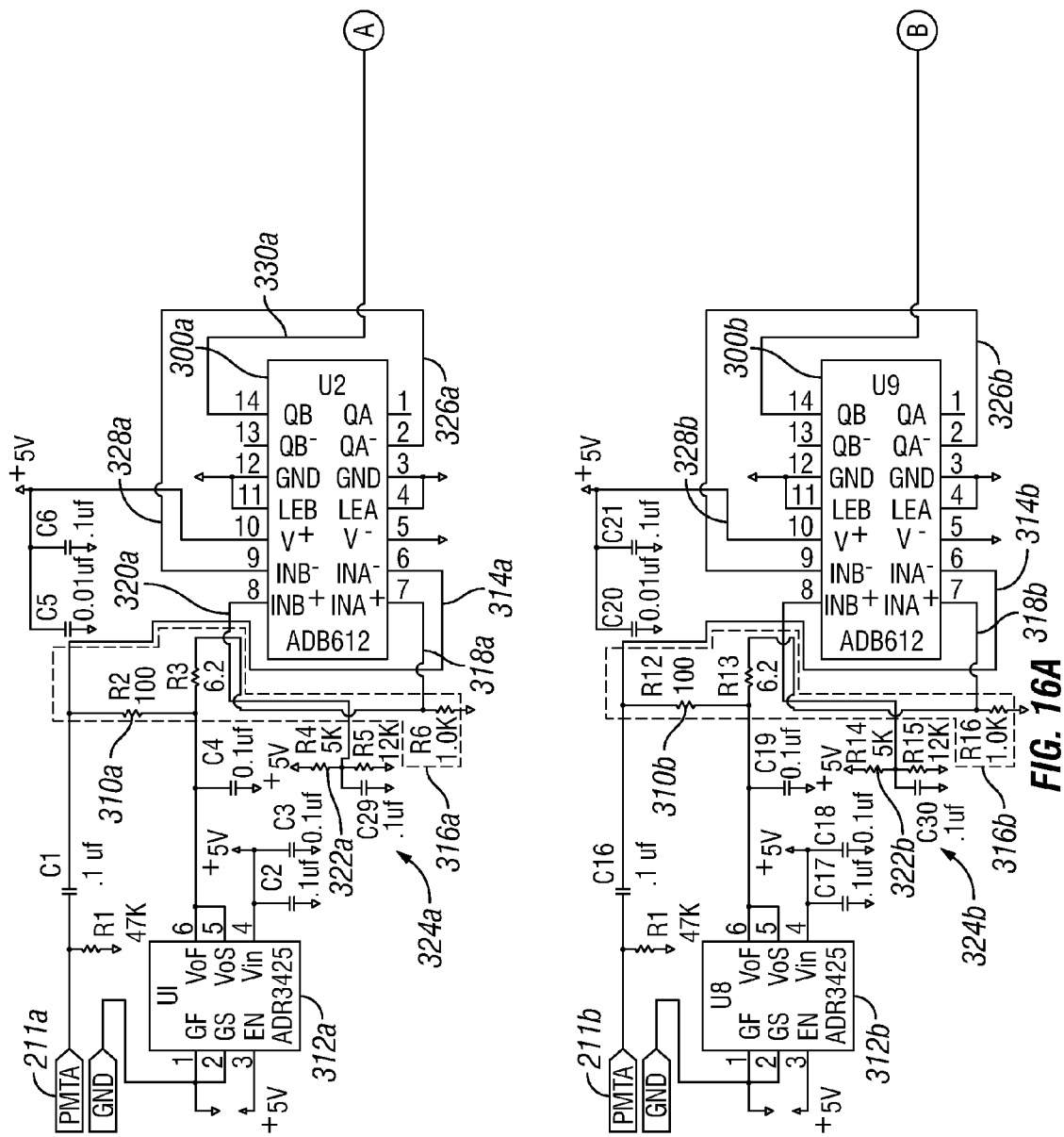
FIGS. 16A-C illustrates a circuit diagram of the circuit used on the signal processing board of the neutron detector.
Figure 16B:
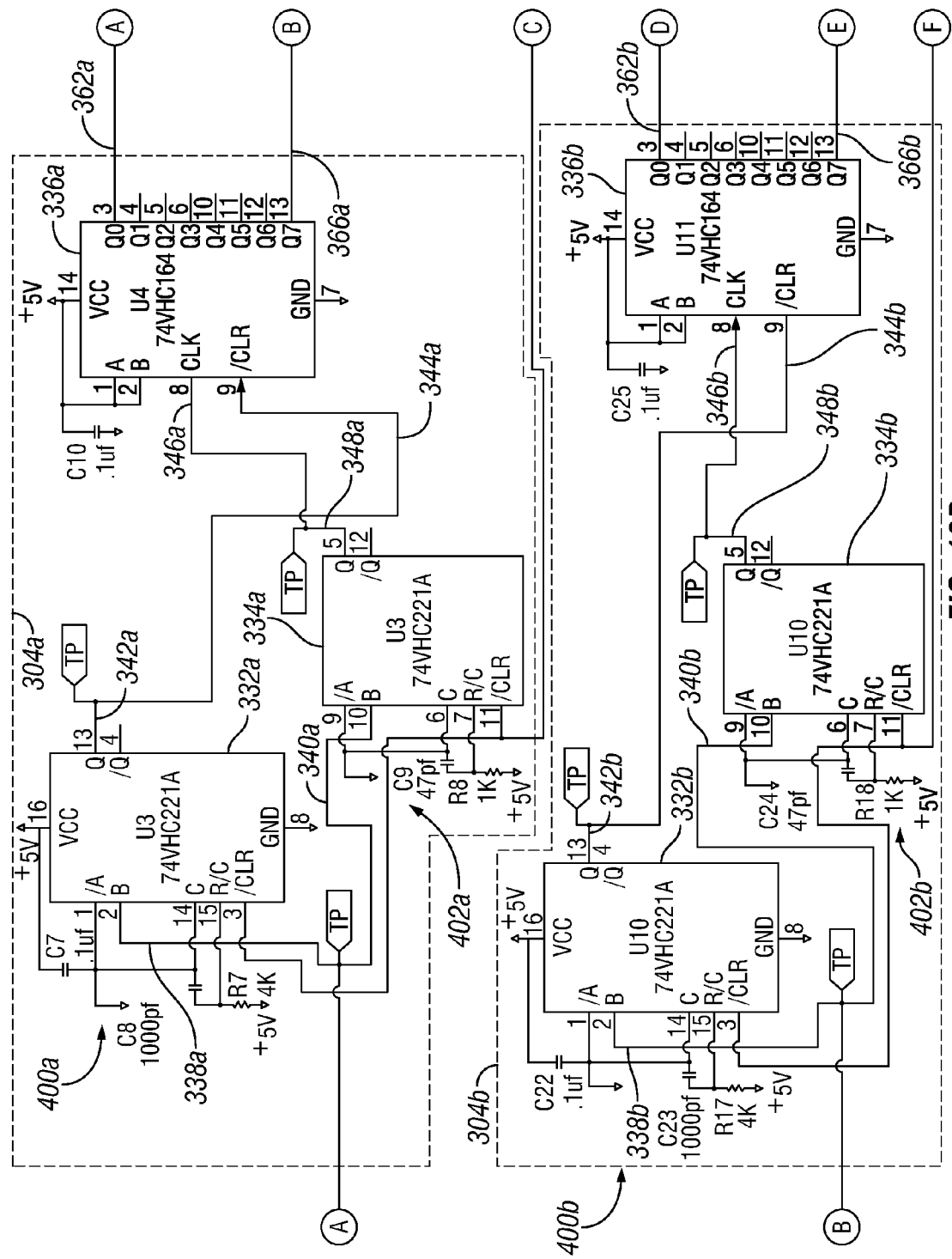
Figure 16C:
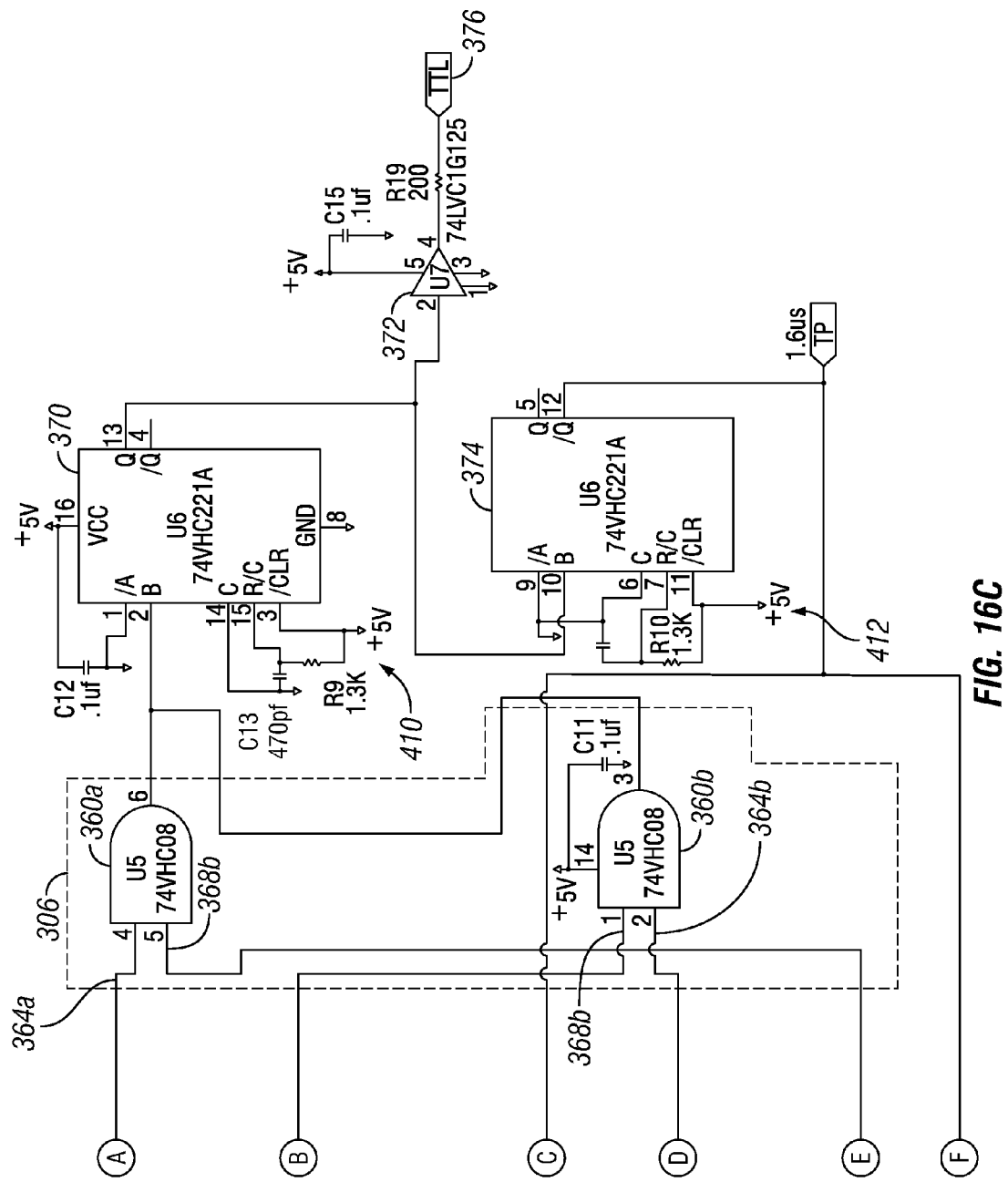

Referring to FIGS. 16A-C, a detailed circuit diagram of the circuit used on the signal processing board 256 is illustrated. As illustrated, the dual channel outputs 211a, 211b of the PMT 210 are connected with a threshold resistor 310a, 310b. The threshold resistors 310a, 310b are connected with an inverting input 314a, 314b of comparators 300a, 300b. Voltage reference supplies 312a, 312b are connected with threshold resistors 310a, 310b and voltage dividers 316a, 316b. Outputs of voltage dividers 316a, 316b are connected with non-inverting first input 318a, 318b of comparators 300a, 300b.

Voltage reference supplies 322a, 322b are connected with voltage dividers 324a, 324b. The outputs of voltage dividers 324a, 324b are connected with second non-inverting inputs 320a, 320b of comparators 300a, 300b. A first inverting output 326a of comparator 300a is connected with a second inverting input 328a of comparator 300a. A first inverting output 326b of comparator 300b is connected with a second inverting input 328b of comparator 300b.

During a neutron event, signals are generated by the PMT 210 from photons that are received by the wavelength shifting optical fibers 164. As set forth above, alternating wavelength shifting optical fibers 164 are directed to each input channel of the PMT 210. In response to the detection of a neutron event, each channel may generate output pulses on outputs 211a, 211b of the PMT 210. Outputs 211a, 211b create a voltage differential between inverting inputs 314a, 314b of comparators 300a, 300b and non-inverting inputs 318a, 318b of comparators 300a, 300b. In response to this voltage differential, inverting outputs 326a, 326b of comparators 300a, 300b go to a logic low which is fed to second inverting inputs 328a, 328b of comparators 300a, 300b. The second non-inverting inputs 320a, 320b are fixed at the output voltage of voltage dividers 322a, 322b thereby creating a voltage differential between the second inverting inputs 328a, 328b and non-inverting inputs 320a, 320b. This voltage differential causes comparators 300a, 300b to generate an output pulse on outputs 330a, 330b of second comparators 300a, 300b. During a neutron event, a plurality of pulses will be generated on outputs 330a, 330b of comparators 300a, 300b thereby creating a pulse train.

Outputs 330a, 330b of comparators 300a, 300b are connected with the positive transition triggered inputs 338a, 340a, 338b, 340b of dual non-retriggerable monostable multivibrators 332a, 332b, 334a, 334b. A timing circuit 400a is connected with multivibrator 332a that is configured to keep multivibrator 332a triggered or in a predetermined logic state (high or low) depending on the output being used (non-inverting or inverting) for a predetermined duty cycle. The multivibrators used herein are non-retriggerable, and therefore cannot be retriggered until the output pulse times out. In one form, timing circuit 400a is configured to keep the multivibrator 332a triggered for approximately 4.6 microseconds once an output pulse is received from comparator 300a.

The non-inverting output 342a of multivibrator 332a is connected with the clear input 344a of counter 336a. As such, when multivibrator 332a is triggered, output 342a goes to a logic high thereby enabling counter 336a. As set forth above, in one form multivibrator 332a is configured to be triggered for a period of about 4.6 microseconds thereby enabling counter 336a for 4.6 microseconds as well.

Another timing circuit 400b is connected with multivibrator 332b that is configured to keep multivibrator 332b triggered for a predetermined duty cycle. In one form, timing circuit 400b is configured to keep multivibrator 332b triggered for approximately 4.6 microseconds once an output pulse is received from comparator 300b. The non-inverting output 342b of multivibrator 332b is connected with the clear input 344b of counter 336b. As such, when multivibrator 332b is triggered, output 342b goes to a logic high thereby enabling counter 336b. In one form, multivibrator 332b is configured to be triggered for a period of 4.6 microseconds thereby enabling counter 336b for 4.6 microseconds as well.

A timing circuit 402a is connected with multivibrator 334a that is configured to keep multivibrator 334a triggered for a predetermined duty cycle. In one form, timing circuit 402a is configured to keep the second multivibrator 334a triggered for approximately 110 nanoseconds once an output pulse is received from comparator 300a. Another timing circuit 402b is connected with multivibrator 334b that is configured to keep multivibrator 334b triggered for a predetermined duty cycle. In one form, timing circuit 402b is configured to keep multivibrator 334b triggered for approximately 110 nanoseconds once an output pulse is received from comparator 300b.

The non-inverting output 348a of multivibrator 334a is connected with the clock input 346a of counter 336a. The non-inverting output 348b of multivibrator 334b is connected with the clock input 346b of counter 336b. During operation, the outputs of the multivibrators 332a, 332b enable counters 336a, 336b for approximately 4.6 microseconds once an output pulse is received from comparators 300a, 300b, respectively. Then, as additional output pulses are received from comparators 300a, 300b, it causes multivibrators 334a, 334b to deliver count pulses to the clock inputs 346a, 346b of counters 336a, 336b.

An output 362a of counter 336a is connected with an input 364a of AND gate 360a of coincidence detection circuit 306. In one form, output 362a of counter 336a is configured to generate a logic high output after receiving two (2) output pulses from multivibrator 334a in less than 4.6 microseconds, which is the duty cycle that counter 336a is enabled by multivibrator 332a. Another output 366a of counter 336a is connected with an input 368a of AND gate 360b. In one form, output 366a of counter 336a is configured to generate a logic high output after receiving nine (9) output pulses from multivibrator 334a in less than 4.6 microseconds, which is the duty cycle that counter 336a is enabled by multivibrator 332a.

An output 362b of counter 336b is connected with an input 364b of AND gate 360b of coincidence detection circuit 306. In one form, output 362b of counter 336b is configured to generate a logic high output after receiving two (2) output pulses from multivibrator 334b in less than 4.6 microseconds, which is the duty cycle that counter 336b is enabled by multivibrator 332b. A second output 366b of counter 336b is connected with an input 368b of AND gate 360a. In one form, output 366b of counter 336b is configured to generate a logic high output after receiving nine (9) output pulses from multivibrator 334b in less than 4.6 microseconds, which is the duty cycle that counter 336b is enabled by multivibrator 332b.

In order for a neutron event to be detected, one or both of the AND gates 360a, 360b must receive a logic high input that originates from each channel of the dual channel PMT 210 detecting a neutron event. In order for AND gate 360a to detect a neutron event, it must receive a logic high input from counter 336a (after it receives two (2) pulses from multivibrator 334a) and a logic high input from counter 336b (after it receives nine (9) pulses from multivibrator 334b). In order for AND gate 360b to detect a neutron event, it must receive a logic high input from counter 336a (after it receives nine (9) pulses from multivibrator 334a) and a logic high input from counter 336b (after it receives two (2) input pulses from multivibrator 334b).

After a neutron event is detected by either the first or second AND gates 360a, 360b, an output pulse is generated by one or both of the AND gates 360a, 360b that is directed toward an input of a multivibrator 370. The outputs of both AND gates 360a, 360b are connected to the input of multivibrator 370. A timing circuit 410 is connected with multivibrator 370 and is configured to keep multivibrator 370 triggered for a predetermined duty cycle once an output is received from the coincidence detection circuit 306. In one form, timing circuit 410 is configured to keep multivibrator 370 triggered for approximately 800 nanoseconds thereby creating an 800 nanosecond output pulse.

The output of multivibrator 370 is connected to the input of a buffer 372. The buffer 372 is used to generate a 5V output pulse that is indicative of a neutron event. As such, the signal processing board 256 is configured to generate an output pulse in the event that a neutron event is detected by the neutron detector 100. The signal processing board 256 takes advantage of stereo detection through the use of dual outputs from the PMT 210.

Use of two detection channels and alternating wavelength shifting fibers allows the neutron detector 100 disclosed herein to distinguish between gamma events and neutron events. Gamma events typically will generate pulse trains that are much shorter lived than neutron events. For example, gamma events will typically generate a pulse train that has a duty cycle of less than 2 microseconds. Neutron event pulse trains are much longer lived and the signal processing board 256 disclosed herein is configured to only respond to these much longer lived pulse trains. For example, neutron events will typically generate a pulse train that has a duty cycle of 10 microseconds or longer with most lasting more than 50-70 microseconds. Thus, the signal processing board 256 disclosed herein is configured to discriminate against gamma events thereby reducing or eliminating a false positive event from being detected that is not a neutron event but rather a gamma event.

The output of multivibrator 370 is also connected to the input of another multivibrator 374. A timing circuit 412 is connected with multivibrator 374 that is configured to give multivibrator 374 a predetermined duty cycle when triggered. In one form, multivibrator 374 is configured to stay triggered for approximately 1.6 microseconds. The output of multivibrator 374 is connected with the clear input of multivibrators 332a, 334a, 332b, 334b. As such, when a neutron event occurs and is detected, multivibrator 374 resets multivibrators 332a, 334a, 332b, 334b thereby creating a 1.6 microsecond dead time.

It is important to note that nearly every photon creates a signal output from the PMT 210 which is the same shape (timing) and size (amplitude) as every other photon. When a gamma photon travels through the scintillator, a very high amplitude signal is seen because the flux of photons is so high and they are so closely packed together that each photon adds its signal to the previous one because the previous photon has not had enough time to tail off. Neutron events also do this, especially in the first microsecond. The present invention takes advantage of the fact that during a neutron event (as opposed to a gamma event), the neutron will continue to produce occasional multiple photons that produce a higher than normal amplitude signal. It is believed that this is because when the neutron is absorbed the nucleus of the absorbing molecule emits an alpha particle and a triton particle. These particles are relatively slow and move through the electron field, knocking off electrons which later get recombined to atoms, emitting photons that then move out of the scintillator and into the wavelength shifting fibers. Because the particles are slow, the present invention throws out the prompt signals and because there are two particles moving simultaneously, the disclosed circuit is designed to look for the high amplitude signals that two photons arriving at the PMT 210 together will create.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention.

Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A neutron detector circuit for a neutron detector, comprising:
    a scintillator having a plurality of wavelength shifting optical fibers, wherein a first set of wavelength shifting optical fibers are connected with a first input of at least one photomultiplier tube ("PMT") and a second set of wavelength shifting optical fibers are connected with a second input of said at least one PMT, wherein said at least one PMT includes a first PMT output and a second PMT output and is operable to generate a first PMT output pulse on said first PMT output in response to a first neutron event detected on said first input of said at least one PMT and a second PMT output pulse on said second PMT output in response to a second neutron event detected on said second input of said at least one PMT;
    a dual channel comparator circuit configured to receive said first PMT output pulse and said second PMT output pulse, wherein in response to said first PMT output pulse said dual channel comparator is configured to generate a first comparator output pulse and in response to said second PMT output pulse said dual channel comparator circuit is configured to generate a second comparator output pulse;

a first logic algorithm circuit configured to receive said first comparator output pulse, wherein said first logic algorithm circuit is configured to generated a first logic algorithm circuit output pulse after a first predetermined number of first comparator output pulses are received by said first logic algorithm circuit and a second logic algorithm circuit output pulse after a second predetermined number of first comparator output pulses are received by said first logic algorithm circuit;

a second logic algorithm circuit configured to receive said second comparator output pulse, wherein said second logic algorithm circuit is configured to generate a third logic algorithm circuit output pulse after a third predetermined number of second comparator output pulses are received by said second logic algorithm circuit and a fourth logic algorithm circuit output pulse after a fourth predetermined number of first comparator output pulses are received by said second logic algorithm circuit; and a coincidence detection circuit connected with said first and second logic algorithm circuits, wherein said coincidence detection circuit is configured to generate a neutron event output pulse if said coincidence detection circuit receives said first logic algorithm output pulse and said third logic algorithm output pulse or said second logic algorithm output pulse and said fourth logic algorithm output pulse.

2. The neutron detector circuit for a neutron detector of claim 1, wherein said dual channel comparator circuit comprises a first comparator and a second comparator, wherein said first comparator is configured to generate said first comparator output pulse and said second comparator is configured to generate said second comparator output pulse.

3. The neutron detector circuit for a neutron detector of claim 1, wherein said first logic algorithm circuit comprises a first multivibrator and a second multivibrator, wherein said first comparator output pulse is provided to inputs of said first and second multivibrators.

4. The neutron detector circuit for a neutron detector of claim 3, wherein said first and second multivibrators comprise non-retriggerable monostable multivibrators.

5. The neutron detector circuit for a neutron detector of claim 3, wherein said first logic algorithm circuit further comprises a first counter, wherein a first multivibrator output of said first multivibrator is connected with a first enable input of said counter and a second multivibrator output of said second multivibrator is connected with a first count input of said first counter.

6. The neutron detector circuit for a neutron detector of claim 5, wherein said second logic algorithm circuit comprises a third multivibrator and a fourth multivibrator, wherein said second comparator output pulse is provided to inputs of said third and fourth multivibrators.

7. The neutron detector circuit for a neutron detector of claim 6, wherein said third and fourth multivibrators comprise non-retriggerable monostable multivibrators.

8. The neutron detector circuit for a neutron detector of claim 6, wherein said second logic algorithm circuit further comprises a second counter, wherein a third multivibrator output of said third multivibrator is connected with a second enable input of said second counter and a fourth multivibrator output of said fourth multivibrator is connected with a second count input of said second counter.

9. The neutron detector circuit for a neutron detector of claim 8, wherein said coincidence detection circuit comprises a first AND gate and a second AND gate, wherein a first counter output of said first counter is connected with a first AND input of said first AND gate and a second counter output of said first counter is connected with a second AND input of said second AND gate, wherein a third counter output of said second counter is connected with a third AND input of said first AND gate and a fourth counter output of said second counter is connected with a fourth AND input of said second AND gate, wherein said neutron event output pulse is generated on either a first AND output of said first AND gate or a second AND output of said second AND gate.

10. The neutron detector circuit for a neutron detector of claim 1, wherein a coincidence detection output of said coincidence detection circuit is connected with an input of a first multivibrator, wherein said first multivibrator is configured to generate a second neutron event output pulse having a predetermined duty cycle in response to said neutron event output pulse.

11. The neutron detector circuit for a neutron detector of claim 10, wherein a coincidence detection output of said coincidence detection circuit is connected with an input of a second multivibrator, wherein a second multivibrator output is connected with a clear input of said first and second logic algorithm circuits, wherein in response to said neutron event output pulse said second multivibrator output is configured to reset said first and second logic algorithm circuits.

12. The neutron detector circuit for a neutron detector of claim 1, wherein said first predetermined number of first comparator output pulses is equal to two output pulses, said second predetermined number of first comparator output pulses is equal to nine output pulses, said third predetermined number of second comparator output pulses is equal to two output pulses, and said fourth predetermined number of second comparator output pulses is equal to nine output pulses.

13. A neutron detector circuit for a neutron detector, comprising:

a scintillator having a plurality of wavelength shifting optical fibers, wherein a first set of wavelength shifting optical fibers are connected with a first input of at least one photomultiplier tube ("PMT") and a second set of wavelength shifting optical fibers are connected with a second input of said at least one PMT;

a first comparator circuit connected with a first PMT output and a second comparator connected with a second PMT output;

a first logic algorithm circuit configured to generate a first logic algorithm output and a second logic algorithm output in response to a first output pulse received from said first comparator;

a second logic algorithm circuit configured to generate a third logic algorithm output and a fourth logic algorithm output in response to a second output pulse received from said second comparator; and a coincidence detection circuit connected configured to be connected with said first, second, third, and fourth logic algorithm outputs, wherein said coincidence detection circuit is configured to generate a neutron event output pulse if output pulses are received on said first and third logic algorithm outputs or said second and fourth logic algorithm outputs.

14. The neutron detector circuit for a neutron detector of claim 13, wherein said first logic algorithm circuit comprises a first multivibrator and a second multivibrator, wherein said first multivibrator is configured to receive said first output pulse and said second multivibrator is configured to receive said first output pulse, wherein said first logic algorithm circuit further comprises a first counter, wherein a first multivibrator output of said first multivibrator is connected with an enable input of said first counter, and wherein a second multivibrator output of said second multivibrator is connected with a first count input of said first counter.

15. The neutron detector circuit for a neutron detector of claim 14, wherein said second logic algorithm circuit comprises a third multivibrator and a fourth multivibrator, wherein said third multivibrator is configured to receive said second output pulse and said second multivibrator is configured to receive said second output pulse, wherein said second logic algorithm circuit further comprises a second counter, wherein a third multivibrator output of said third multivibrator is connected with a second enable input of said second counter, and wherein a fourth multivibrator output of said fourth multivibrator is connected with a second count input of said second counter.

16. The neutron detector circuit for a neutron detector of claim 15, wherein said coincidence detection circuit comprises a first AND gate and a second AND gate, wherein said first AND gate is configured to receive said first and third logic algorithm outputs and said second AND gate is configured to receive said second and fourth logic algorithm outputs.

17. The neutron detector circuit for a neutron detector of claim 13, further comprising a first multivibrator configured to receive said neutron event output pulse from said coincidence detection circuit, wherein said first multivibrator is configured to generate a second neutron event output pulse having a predetermined duty cycle in response to said neutron event output pulse.

18. The neutron detector circuit for a neutron detector of claim 17, further comprising a second multivibrator configure to receive said neutron event output pulse from said coincidence detection circuit, wherein an output of said second multivibrator is connected with said first and second logic algorithm circuits, wherein said output is configure to reset said first and second logic algorithm circuits in response to said neutron event output pulse.

19. A neutron detection circuit for a neutron detector, comprising:
a scintillator having a plurality of wavelength shifting optical fibers, wherein a first set of wavelength shifting optical fibers are connected with a first input of at least one photomultiplier tube ("PMT") and a second set of wavelength shifting optical fibers are connected with a second input of said at least one PMT;
a first comparator connected with a first PMT output of said at least one PMT;
a second comparator connected with a second PMT output of said at least one PMT;
a first multivibrator connected with a first comparator output of said first comparator;
a second multivibrator connected with said first comparator output of said first comparator;
a third multivibrator connected with a second comparator output of said second comparator;
a fourth multivibrator connected with said second comparator output of said second comparator;
a first counter connected with a first multivibrator output of said first multivibrator, wherein a second multivibrator output of said second multivibrator is connected with said first counter, wherein said first multivibrator output is connected with a first enable input of said first counter and said second multivibrator output is connected with a first count input of said first counter;
a second counter connected with a third multivibrator output of said third multivibrator, wherein said fourth multivibrator output of said fourth multivibrator is connected with a second enable input of said second counter and said fourth multivibrator output is connected with a second count input of said second counter; and
a first AND gate and a second AND gate, wherein a first counter output of said first counter is connected with said first AND gate, a second counter output of said first counter is connected with said second AND gate, a third counter output of said second counter is connected with said first AND gate, a fourth counter output of said second counter is connected with said second AND gate, wherein said first AND gate is configured to generate a neutron event output pulse if output pulses are received from said first and third counter outputs and said second AND gate is configured to generate said neutron event output pulse if output pulses are received from said second and fourth counter outputs.

20. The neutron detector circuit for a neutron detector of claim 19, wherein said neutron event output pulse is only generated after said first counter receives two output pulses from said second multivibrator and said second counter receives nine output pulses from said fourth multivibrator or said first counter receives nine output pulses from said second multivibrator and said second counter receives two output pulses from said fourth multivibrator.

* * * * *